United States Patent
O'Connor et al.

(10) Patent No.: US 6,642,171 B2
(45) Date of Patent: Nov. 4, 2003

(54) DOUBLE METAL CYANIDE CATALYSTS CONTAINING POLYGLYCOL ETHER COMPLEXING AGENTS

(75) Inventors: James M. O'Connor, Cheshire, CT (US); Robin L. Grieve, North Guilford, CT (US)

(73) Assignee: Synuthane International, Inc., Newington, CT (US)

(*) Notice: Subject to any disclaimer, the term of this patent is extended or adjusted under 35 U.S.C. 154(b) by 0 days.

(21) Appl. No.: 09/844,982

(22) Filed: Apr. 27, 2001

(65) Prior Publication Data

US 2001/0046940 A1 Nov. 29, 2001

Related U.S. Application Data

(60) Provisional application No. 60/238,202, filed on Oct. 5, 2000, and provisional application No. 60/200,212, filed on Apr. 28, 2000.

(51) Int. Cl.⁷ .............................. B01J 27/26; B01J 31/00
(52) U.S. Cl. ....................... 502/175; 502/200; 502/156
(58) Field of Search ................................ 502/156, 175, 502/200

(56) References Cited

U.S. PATENT DOCUMENTS

| | | |
|---|---|---|
| 3,427,256 A | 2/1969 | Milgrom |
| 3,427,334 A | 2/1969 | Belner |
| 3,427,335 A | 2/1969 | Herold |
| 3,538,053 A | 11/1970 | Rembaum et al. |
| 3,829,505 A | 8/1974 | Herold |
| 4,472,560 A | 9/1984 | Kuyper et al. |
| 4,477,589 A | 10/1984 | van der Hulst et al. |
| 4,582,926 A | 4/1986 | Streahle et al. |
| 5,010,047 A | 4/1991 | Schuchardt |
| 5,010,117 A | 4/1991 | Herrington et al. |
| 5,093,380 A | 3/1992 | Takeyasu et al. |
| 5,096,993 A | 3/1992 | Smith et al. |
| 5,100,997 A | 3/1992 | Reisch et al. |
| 5,116,931 A | 5/1992 | Reisch et al. |
| 5,136,010 A | 8/1992 | Reisch et al. |
| 5,145,883 A | 9/1992 | Saito et al. |
| 5,158,922 A | 10/1992 | Hinney et al. |
| 5,185,420 A | 2/1993 | Smith et al. |
| 5,340,902 A | 8/1994 | Smith et al. |
| 5,391,722 A | 2/1995 | Chandalia et al. |
| 5,436,883 A | 7/1995 | Sugiura |
| 5,437,822 A | 8/1995 | Wada et al. |
| 5,470,813 A | 11/1995 | Le-Khac |
| 5,482,908 A | 1/1996 | Le-Khac |
| 5,536,883 A | 7/1996 | Le-Khac |
| 5,545,601 A | 8/1996 | Le-Khac |
| 5,563,221 A | 10/1996 | Pazos |
| 5,576,382 A | 11/1996 | Seneker et al. |
| 5,589,431 A | 12/1996 | Le-Khac |
| 5,596,075 A | 1/1997 | Le-Khac |
| 5,627,120 A | 5/1997 | Le-Khac |
| 5,627,122 A | 5/1997 | Le-Khac et al. |
| 5,637,673 A | 6/1997 | Le-Khac |
| 5,639,705 A | 6/1997 | Bowman et al. |
| 5,648,559 A | 7/1997 | Hager |
| 5,668,191 A | 9/1997 | Kinkelaar et al. |
| 5,688,861 A | 11/1997 | Simroth et al. |
| 5,689,012 A | 11/1997 | Pazos et al. |
| 5,691,441 A | 11/1997 | Seneker et al. |
| 5,693,584 A | 12/1997 | Le-Khac |
| 5,696,221 A | 12/1997 | Barksby et al. |
| 5,708,118 A | 1/1998 | Seneker et al. |
| 5,712,216 A | 1/1998 | Le-Khac et al. |
| 5,714,428 A | 2/1998 | Le-Khac |
| 5,714,639 A | 2/1998 | Bowman et al. |
| 5,723,563 A | 3/1998 | Lawrey et al. |
| 5,738,745 A | 4/1998 | Hudson et al. |
| 5,763,642 A | 6/1998 | Cai |
| 5,767,323 A | 6/1998 | Televantos et al. |

(List continued on next page.)

FOREIGN PATENT DOCUMENTS

| | | |
|---|---|---|
| DE | 203735 | 11/1983 |
| EP | 0394487 B1 | 3/1996 |
| EP | 1022300 | 7/2000 |
| WO | WO 99/19062 A1 | of 1999 |
| WO | WO 99/14258 A1 | 3/1999 |
| WO | WO 99/16775 A1 | 4/1999 |
| WO | WO 99/19063 | 4/1999 |
| WO | WO 99/33562 A1 | 7/1999 |
| WO | WO 99/46042 A1 | 9/1999 |
| WO | WO 99/56874 A1 | 11/1999 |
| WO | WO 99/66874 A1 | 12/1999 |
| WO | WO 00/02951 | 1/2000 |
| WO | WO 00/07720 | 2/2000 |
| WO | WO 00/07721 | 2/2000 |
| WO | WO 00/17836 | 3/2000 |
| WO | WO 00/18817 | 4/2000 |
| WO | WO 01/03831 A1 | 1/2001 |
| WO | WO 01/04181 A1 | 1/2001 |

OTHER PUBLICATIONS

C. P. Smith, A. T. Chen and J. M. O'Connor; *Novel Aliphatic Thermoplastic Polyurethane Elastomers Based on Isophorone Disocyanate and Poly (Propylene Oxide) Glycols That Have Low Terminal Unsaturation*; 1993; pp. 1271–1278; Olin Corporation, Cheshire, CT, USA.

(List continued on next page.)

*Primary Examiner*—Elizabeth D. Wood
(74) *Attorney, Agent, or Firm*—Locke Liddell & Sapp LLP

(57) ABSTRACT

Double metal cyanide ("DMC") complex catalysts comprise a double metal cyanide compound and a complexing agent such as an alkyl ether of a glycol, preferably of the formula $$R_1O(CH_2CHR_2O)_xH \qquad (I)$$

wherein:

x is 1, 2, or 3;

$R_1$ is a $C_1$–$C_4$ alkyl group; and $R_2$ is a —H or a —$CH_3$ group.

Such catalysts have particular applicability in the production of low unsaturated polyols from epoxides.

47 Claims, 9 Drawing Sheets

U.S. PATENT DOCUMENTS

| | | |
|---|---|---|
| 5,777,177 A | 7/1998 | Pazos |
| 5,780,584 A | 7/1998 | Le-Khac et al. |
| 5,783,513 A | 7/1998 | Combs et al. |
| 5,789,626 A | 8/1998 | Le-Khac |
| 5,811,829 A | 9/1998 | Lawrey et al. |
| 5,844,070 A | 12/1998 | Hayes et al. |
| 5,856,372 A | 1/1999 | Ho et al. |
| 5,891,818 A | 4/1999 | Soltani-Ahmadi |
| 5,919,988 A | 7/1999 | Pazos et al. |
| 5,952,261 A | 9/1999 | Combs |
| 6,008,263 A | 12/1999 | Thompson et al. |
| 6,013,596 A | 1/2000 | Le-Khac et al. |
| 6,018,017 A | 1/2000 | Le-Khac |
| 6,022,903 A | 2/2000 | Younes et al. |
| 6,028,230 A | 2/2000 | Le-Khac et al. |
| 6,036,879 A | 3/2000 | Lawrey et al. |
| 6,051,680 A | 4/2000 | Faraj |

OTHER PUBLICATIONS

C. P. Smith, J. W. Reisch and J.M. O'Connor; *Thermoplastic Polyurethane Elastomer Made from High Molecular Weight POLY–L® Polyols*; Journal of Elastomers and Plastics; vol. 24, pp. 306–322; Oct. 1992; Olin Corporation, Cheshire, CT, USA.

Von H. Siebert, B. Nuber and W. Jentsch; *Trigonal kristallisierende Metall(II)–hexacyanoferrate(II) M2[Fe(CN)6]*; Anorganisch–Chemisches Institut der Universitat ; Mar. 31, 1991; vol. 474, pp. 96–104.

J.L. Schuchardt and S.D. Harper; *Preparation of High Molecular Weight Polyols Using Double Metal Cyanide Catalysts*; 32nd Annual Polyurethane Technical Marketing Conference; Oct. 1, 1989; pp. 360–364; ARCO Chemical Company, Newtown Square, Pennsylvania, USA.

R.L. Mascioli; *Urethane Applications for Novel High Molecular Weight Polyols*; 32nd Annual Polyurethane Technical/Marketing Conference; Oct. 1, 1989; pp. 139–142; ARCO Chemical Company, Newtown Square, Pennsylvania USA.

J. Kuyper and G. Boxhoorn; *Hexacyanometallate Salts Used as Alkene–Oxide Polymerization Catalysts and Molecular Sieves*; Feb. 10, 1986; revised Oct. 6, 1986; vol. 105, ppl. 163–174; Journal of Catalysts; Acedemic Press, Inc., USA.

D.F. Mulllica, W. O. Milligan, G. W. Beall and W. L. Reeves; *Crystal Structure of Zn3[Co(CN)6]2 12H2O*; Aug. 15, 1978; B34, pp. 3558–3561; Baylor Univ.; USA.

Robert J. Herold and Russell A. Livigni; *Hexacyanometalate Salt Complexes as Catalysts for Epoxide Polymerization*; 1972; pp. 545–550; General Tire and Rubber Company; Akron, Ohio, USA.

Robert J. Herold and Russell A. Livigni; *Hexacyanometalate Salt Complexes as Catalysts for Epoxide Polymerization*; Apr. 13, 1972; pp. 208–229; General Tire and Rubber Company; Akron, Ohio, USA.

Robert J. Herold and Russell A. Livigni, O. C. Elmer, and S. L., Aggarwal; *Poly(Propylene Ether) Polyols Prepared With a Zinc Hexacyanocobaltate Complex Catalyst*; pp. 20–37; General Tire and Rubber Co., Akron, Ohio, USA.

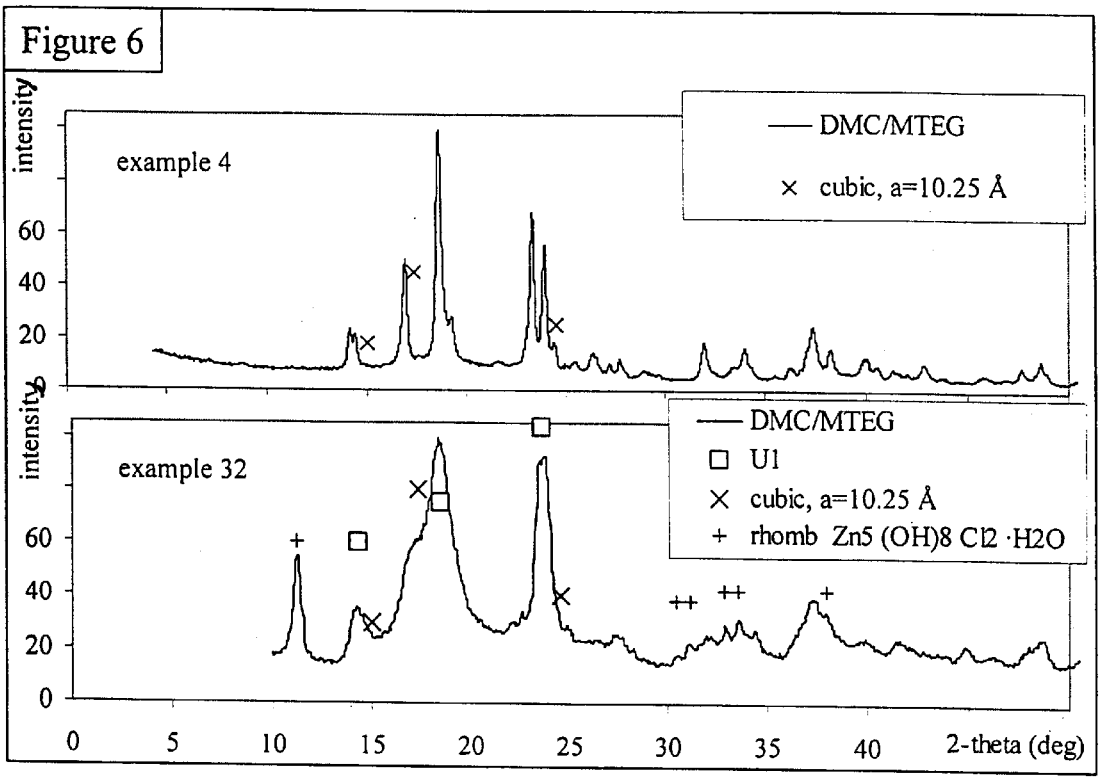

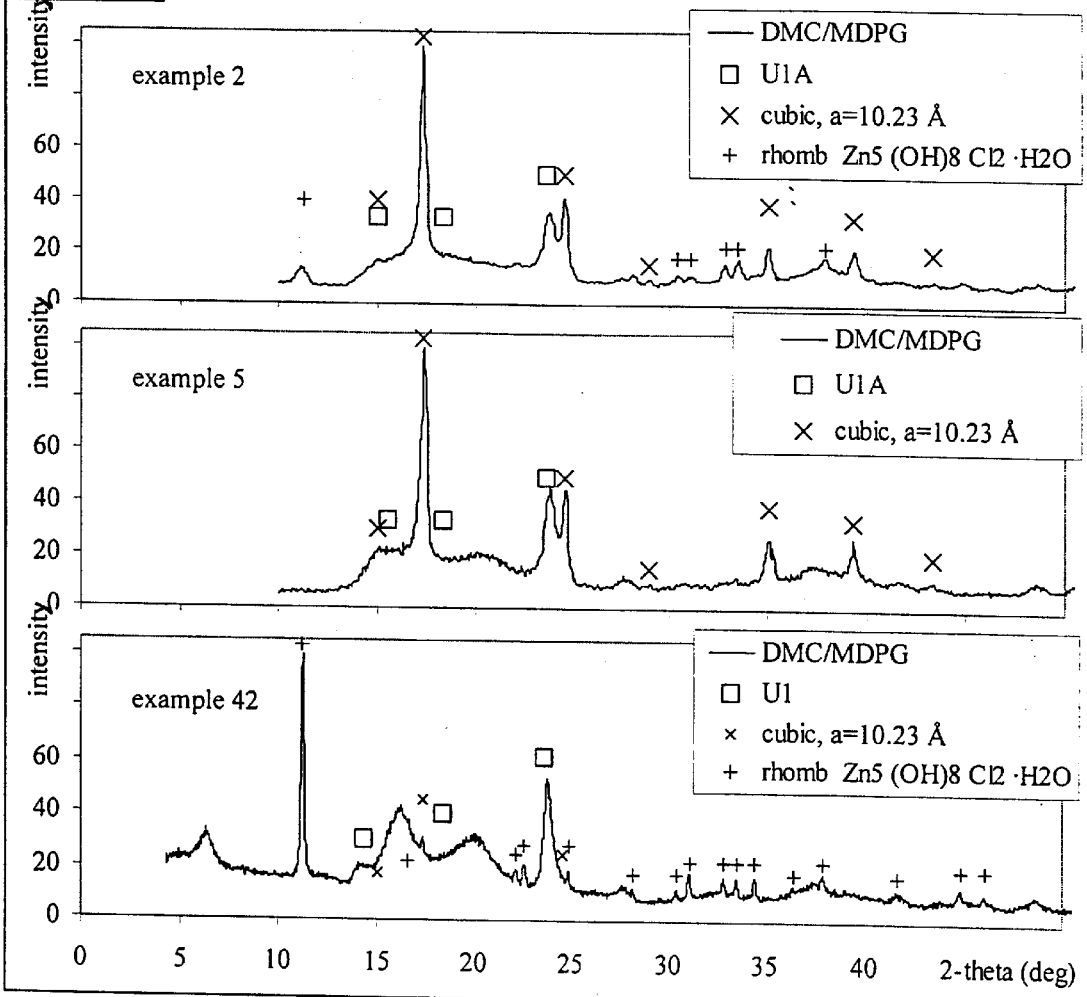
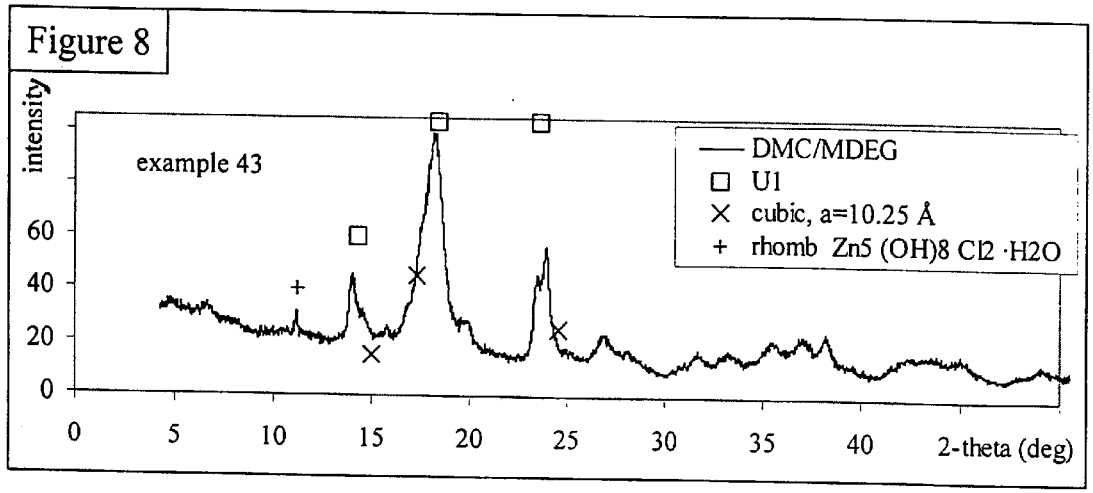

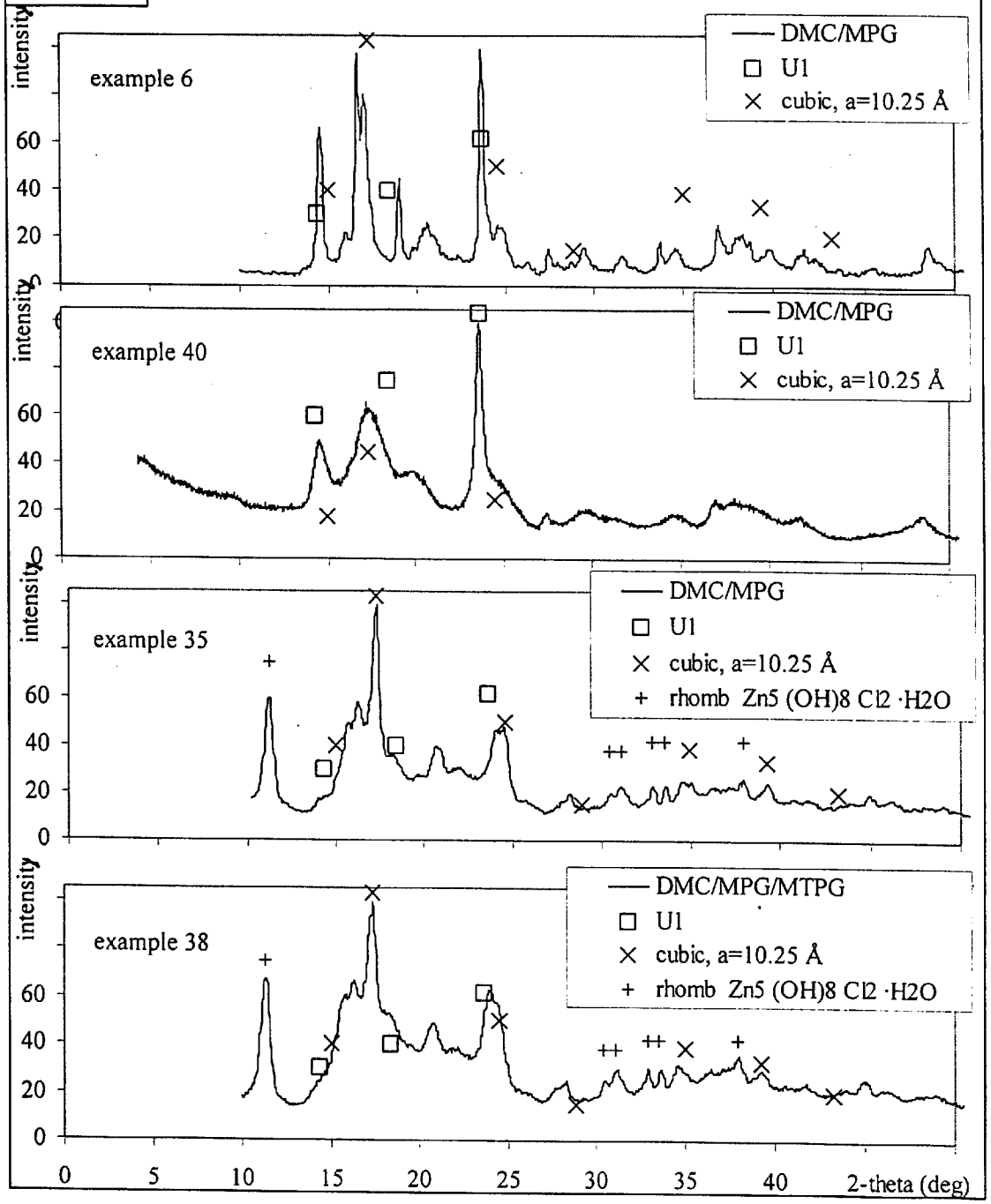

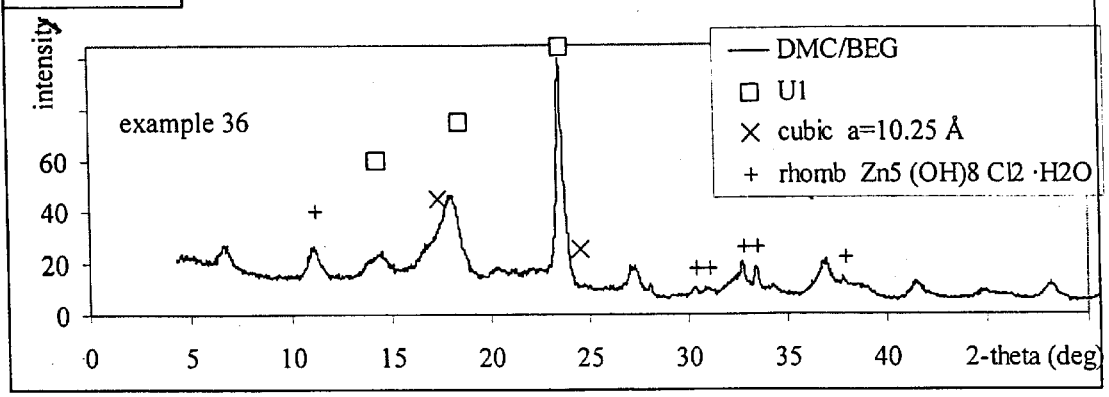

DOUBLE METAL CYANIDE CATALYSTS CONTAINING POLYGLYCOL ETHER COMPLEXING AGENTS

FIELD OF THE INVENTION

The invention relates to double metal cyanide ("DMC") complex catalysts which are especially useful in the polymerization of epoxides and show significant activity. The invention further is directed to methods for preparing such DMC catalysts.

BACKGROUND OF THE INVENTION

DMC compounds are known catalysts for epoxide polymerization. Conventional DMC catalysts are prepared by reacting an aqueous solution of a metal salt and metal cyanide salt to form a precipitate of the DMC compound. The catalysts are highly active and are especially useful in the production of polyether, polyester, and polyetherester polyols having low unsaturation. Many of such polyols are useful in the production of polyurethane coatings, elastomers, sealants, foams, and adhesives.

DMC catalysts were disclosed over 30 years ago by General Tire. U.S. Pat. No. 3,427,256 discloses a composition containing two metals selected from a wide variety of metals along with an organic complexing agent selected from an ether with only ether functionality, a sulfide with only sulfide functionality, an amide with only amide functionality and a nitrile with only nitrile functionality wherein the complexing agent serves to activate the catalyst. This patent also discloses a method for washing the DMC with the organic complexing agent. U.S. Pat. No. 3,427,334 discloses DMC compositions containing the same metals set forth in U.S. Pat. No. 3,427,256 with organic complexing agents selected from alcohols with only hydroxyl functionality, aldehydes with only aldehyde functionality, ketones with only ketone functionality, and methods for the washing and drying of the catalyst. U.S. Pat. No. 3,427,335 discloses DMC compositions containing, as the organic complexing agent, ethers which also may contain halogen, esters with only ester functionality, cyclic ethers with only cyclic ether functionality, and methods for precipitating the catalyst and washing and drying it. U.S. Pat. No. 3.404,109 discloses a DMC catalyst composition of formula $Zn_3[Co(CN)_6]_2 \cdot 1.7$ glyme $\cdot 1.2$ $H_2O$ $\cdot 1.2$ $ZnCl_2$. This gives a mole fraction Zn/Co of 2.1. In each of these patents, the DMC is first precipitated without organic complexing agent followed by washing with a complexing agent/water mixture. General Tire further describes similar DMC/glyme catalysts in several research articles published in the open scientific literature. See, for example, R. J. Herold et al., Polym. Prepr., Amer. Chem. Soc., Div. Polym. Chem., "Hexacyanometallate Salt Complexes for Epoxide Polymerization" (1972) 13(1), 545–550, discussed in further detail below.

U.S. Pat. Nos. 4,477,589 and 4,472,560 disclose DMC catalyst compositions and a process for polymerizing epoxides with such catalysts, respectively. This improved DMC technology is also discussed in a research paper. See J. Kuyper et. al., J. Catal, "Hexacyanometallate Salts Used as Alkene—Oxide Polymerization Catalysts and Molecular Sieves," (1987), 105(1), 163–174, discussed in detail below. The compositions of the DMC and associated organic complexing agents in the '560 patent are similar to those described in t he patents of the preceding paragraph and further include, as additional complexing agents or activators, an acid such as HCl and a salt, such as $ZnSO_4$, generally added to the reactor with the DMC catalyst just prior to polymerization. U.S. Pat. No. 4,477,589 discloses an acid modified DMC prepared initially without organic complexing agent, followed by the addition of sodium hydroxide to form the intermediate hydroxide salt, isolation, and lastly neutralization by HCl with and without glyme organic complexing agent. In both patents, the ethers or glymes are the preferred organic activating agent. These patents further disclose the use of Zn and Co in the presence of glyme, HCl, and $ZnSO_4$.

A method where the DMC catalyst is precipitated in the presence of the organic complexing agent, is also taught later in a Japanese Patent (JP 4,145,123) and in U.S. Pat. No. 5,712,216. Japanese Patent JP 4,145,123 teaches DMC catalysts coordinated with tert-butanol, prepared by stirring an aqueous solution containing zinc chloride, potassium cyanocobaltate, and the tert-butanol ligand. This catalyst had a substantially improved catalytic life over the DMC/glyme catalyst.

U.S. Pat. No. 5,158,922 discloses an improved process for making easily filtered DMC catalysts by controlling the order of reagent addition, the reaction temperature, and the stoichiometric ratio of the reactants. This patent teaches the use of at least about a 100% stoichiometric excess of the metal salt relative to the metal cyanide salt and glyme, as organic complexing agent. Zinc hexacyanocobaltate catalysts prepared by this procedure generally have zinc chloride to zinc hexacyanocobaltate molar ratios of about 0.6 or more; i.e., a mole fraction Zn/Co>1.8. It further discloses compositions having as little as 0.2 moles of metal salt per mole of DMC compound (Zn/Co=1.6). While the procedure described in the '922 patent (large excess of zinc chloride) works well with glyme, it is stated in U.S. Pat. No. 5,627,122 that this excess is less satisfactory for use with other complexing agents, including tert-butyl alcohol. When tert-butyl alcohol is used, the catalyst precipitate becomes gelatinous and difficult to isolate. In addition, the activity of these catalysts for epoxide polymerizations, although high compared with KOH catalysts, is still somewhat less than desirable.

U.S. Pat. Nos. 5,470,813 and 5,712,216 disclose improved methods for making DMC catalysts in the presence of an organic complexing agent, preferably t-butanol. The '813 Patent uses a homogenization method wherein a water soluble metal salt is intimately mixed with a water soluble metal cyanide salt. The homogenizer used is not described. In the examples, t-butanol, as complexing agent, is slowly added after the other salts are mixed. Contrasting examples with "normal" mixing fail to show the same activity. U.S. Pat. No. 5,712,216 discloses a method where the organic complexing agent is initially present in the reactant solutions, eliminating the need for homogenization. Here, all of the included examples only show data for reduced unsaturation, with no demonstration of improved activity.

U.S. Pat. Nos. 5,482,908 and 5,627,120 teach improvement of the activity of the DMC catalyst by the use of two complexing agents. The first complexing agent, in an amount of from 5 to 80 wt. %, is a polyether polyol. U.S. Pat. No. 5,482,908 covers polyols having a number average molecular weight of greater than 500 Da (preferred is poly(propylene oxide) polyol with molecular weight between 2,000 and 4,000). U.S. Pat. No. 5,627,120 covers polyols having a number average molecular weight less than 500 Da, and may contain, as polyol activator, the monomethyl ether of tripropylene glycol with t-butanol. In each case, the second organic complexing agent is t-butanol. A stated advantage is the reduction of Co and Zn in the final polyol, reported to be ≦5 ppm.

Companion patents include U.S. Pat. Nos. 5,589,431 and 6,018,017. U.S. Pat. No. 5,589,431 discloses a method for producing polyols and compositions of matter for polyols produced with the catalysts of U.S. Pat. No. 5,470,813. U.S. Pat. No. 6,018,017 discloses polyols as being limited to triols and higher functionality polyols, produced from the catalysts of U.S. Pat. No. 5,712,216.

U.S. Pat. No. 5,627,122 discloses a "crystalline" DMC complex catalyst which comprises a DMC compound, an organic complexing agent, and a metal salt, wherein the catalyst contains less than about 0.2 moles of the metal salt per mole of DMC compound; i.e., mole fraction Zn/Co<1.6. Organic complexing agents include alcohols, aldehydes, ketones, ethers, esters, amides, ureas, nitrites, sulfides, and mixtures thereof. With low levels of $ZnCl_2$, these catalysts are very active and reportedly produce polyols with very low unsaturation. WO 99/19063 discloses a "substantially crystalline" DMC catalyst that incorporates a normal complexing agent, such as t-butanol, and a functional polymer such as a polyether, a polyester, a polycarbonate, and similar functional polymers. The $ZnCl_2$ content is greater than 0.2 mole/mole of DMC (Zn/Co>1.6). Polyols produced from these crystalline DMC catalysts have low unsaturation, lower than 0.01 meq/g.

Polyol activators are further disclosed in WO 99/19062 (polyester activator), WO 99/33562 (polycarbonate activator) and WO 99/46042 (polyethylene oxide polyol modifier with a molecular weight greater than 500). Additional patents, WO/0007720, WO/0007721, WO/0015336, WO/0015337, WO/0047649, WO/0047650, and U.S. Pat. No. 6,204,357 disclose a DMC catalyst containing t-butanol further modified with a secondary complexing agent of an alkyl glucoside, a glycidol capped polyol, a polyalkylene glycol sorbitan ester, a polyvalent carboxylic acid ester, a bile acid ester or amide, or an ionic surface or interface active compound, and one or more cyclodextrins, respectively.

U.S. Pat. No. 5,545,601 discloses a DMC catalyst containing t-butanol modified with a polyol having tertiary alcohol end groups. The tertiary end group polyols are stated to improve catalyst activity and maintain low unsaturation at higher polymerization temperatures.

U.S. Pat. No. 5,714,428 discloses DMC catalysts modified with other functional polymers such as a polyester, a polycarbonate, an oxazoline, a polyalkylenimine, a maleic acid or maleic anhydride copolymer, hydroxyethyl cellulose, starches and polyacetals in addition to t-butanol. Furthermore, U.S. Pat. No. 6,013,596 discloses cyclic bidentate complexing agents such as lactones or lactams in addition to t-butanol.

Catalyst modifications are further disclosed in U.S. Pat. No. 5,693,584 which is directed to the addition of an organo phosphine oxide to a DMC catalyst in order to maintain low unsaturation even where propoxylation is carried out at higher temperatures. The companion to this patent, U.S. Pat. No. 6,211,330, covers the process to make epoxide polymers form this catalyst. Moreover, U.S. Pat. No. 5,952,261 discloses a composition and method to prepare a DMC catalyst modified with Group IIA compounds, such as $CaCl_2$. In addition, protic acid DMC modification, disclosed in WO 09966874, non-protic acid DMC modification, disclosed in U.S. Pat. No. 6,028,230, and silylated modified DMC catalysts disclosed in U.S. Pat. No. 6,051,680, claim to eliminate the high molecular weight tail that is prevalent with DMC polymerizations.

WO 99/16775 discloses a crystalline DMC catalyst in which the standard $ZnCl_2$ is replaced with zinc formate, acetate, or propionate and the organic complexing agent is broadly defined as alcohols, aldehydes, ketones, ethers, esters, amides, ureas, nitriles, and sulfides.

As discussed above, DMC catalysts are usually prepared in the presence of a low molecular weight organic complexing agent, typically an ether such as glyme (1,2-dimethoxyethane) or diglyme. The complexing agent favorably impacts the activity of the catalyst for epoxide polymerization. Other known complexing agents include alcohols, ketones, esters, amides, and ureas. As disclosed in Japanese Patent JP 4,145,123 and in U.S. Pat. No. 5,470,813, preparations of DMC catalysts with water-soluble aliphatic alcohol complexing agents, such as tert-butyl alcohol, are widely used. DMC catalysts are normally produced with an excess of the metal salt compared with the amount of metal cyanide salt as set forth in U.S. Pat. Nos. 3,427,256, 3,278,457, and 3,941,849.

The structures of DMC catalysts are not well understood. Recently, four patents, discussed above—U.S. Pat. Nos. 5,470,813; 5,712,216; 5,482,908; and 5,627,120—stated that the improved activity of DMC catalysts was attributed to the DMC catalysts being "substantially amorphous", in spite of powder x-ray diffraction that showed otherwise. Additionally U.S. Pat. Nos. 5,627,122 and WO 99/19063 characterized DMC catalysts with improved activity as being "substantially crystalline." Applying the teachings of U.S. Pat. No. 5,712,216 to the "substantially crystalline" Catalyst A of WO 99/19063 would lead to the incorrect conclusion that the "substantially crystalline" Catalyst A of WO 99/19063 is approximately 40% crystalline and 60% amorphous (based on XRPD).

Contrary to the teachings set forth in U.S. Pat. Nos. 5,470,813; 5,712,216; 5,627,120; and 5,482,908, as well as WO 99/19062, amorphous DMC catalysts have not yet been discovered. Many DMC catalysts are poorly understood based on their powder X-ray diffraction (XRPD) patterns, and, as discussed above, have been incorrectly characterized as being "amorphous" or "substantially amorphous". Amorphous materials, including amorphous catalysts, exhibit no more than two or three broad XRPD peaks ("maxima"). In order for an amorphous structure to exist, the atomic structure would need to exhibit either no periodicity or no long-range order. Thus, to date, all claims of amorphous DMC catalysts are either false or unsubstantiated.

FIG. 1 shows a XRPD pattern that we took for amorphous silica, using the experimental setup later described as the second XRPD method. Relative to other XRPDs shown herein, the intensity axis shown in this XRPD is highly magnified. This XRPD pattern can be compared against a pattern given for amorphous silica in the book by Snyder and Jenkins "Introduction to X-ray Powder Diffractometry", Wiley-Interscience, 1996, page 25.

Characteristically, the first peak in an amorphous silica pattern should be the largest. This is the peak labeled "2", occurring at about 23 degrees two-theta. The peak labeled "3" at 43 degrees two-theta shows up only on higher magnification, and is also associated with amorphous silica. The peak labeled "1" (14 degrees two-theta) appears to belong to another amorphous material, perhaps the amorphous kapton film used in wrapping this sample (under normal magnification, this would not show up; kapton film was not used for any other PXRD patterns contained herein). The increase in intensity for two-theta <10 degrees is due to air scatter in this highly-magnified pattern. The sharp peak labeled "i" occurring at about 28 degrees two-theta is due to a crystalline impurity either in the sample or in the sample holder. This impurity represents well less than 1 weight percent of the sample.

As set forth in FIG. 1, amorphous materials, including amorphous catalysts, exhibit no more than two or three broad XRPD peaks ("maxima"). In order for an amorphous structure to exist, the atomic structure would need to exhibit either no periodicity or no long-range order. Thus, to date, all claims of amorphous DMC catalysts are either false or unsubstantiated.

FIG. 1 and FIG. 2 show XRPD for crystalline DMC compounds from U.S. Pat. Nos. 5,712,216; 5,714,428; and 5,627,122. In contrast to amorphous structures, the XRPD for crystalline materials demonstrate near-zero intensity except for sharp maxima [B. D. Cullity and S. R. Stock, Elements of X-ray Diffraction, 3rd Ed., (Prentice Hall, Upper Saddle River, N.J., 2001)]. For instance, the sharp peak at about 28° 2-theta in FIG. 1 is due to a crystalline impurity in the amorphous silica sample.

The structural form of a material can be determined by the nature of the XRPD peaks, including their positions, intensities and widths. Widths are determined as full width at half maximum (FWHM)), and are dependent on the wavelength ($\lambda$) of the X-ray source. [When used herein, values of FWHM are for Cu Ka radiation ($\lambda$=1.54 Å)]. For perfect crystals, XRPD resolution is limited by the diffractometer (perfectly sharp scattering). Typically, FWHM <0.3° 2-theta. For imperfect (defective) crystals, and also for very small crystals (domains less than 500 Å), the peaks are broadened, with 0.3<FWHM<4° 2-theta. Peak broadening can also be due to a variety of effects, including crystallite size, defects and structural disorder. For liquids and amorphous solids (glasses), the XRPD intensity is a continuous, slowly varying function with only a few broad maxima, each of which has a FWHM typically exceeding 4° 2-theta. For these cases, the atomic structure exhibits no periodicity or long-range order. In FIG. 1, the sharp peak due to the crystalline impurity (labeled "i") has FWHM=0.12° 2-theta, and the main peak due to amorphous silica (labeled "2") has FWHM>8° 2-theta. For the XRPD pattern for amorphous silica in Snyder's text book, the main peak has FWHM>12° 2-theta.

The DMC catalysts of FIGS. 1 and 2 are considered to be imperfect crystals, except for the cubic DMC of FIG. 2, which appears to be a very small crystal. Some crystalline DMC catalysts, as shown in FIGS. 1 and 2, have broad peaks (FWHM roughly 2°) at roughly 14 and 18°. In such DMC catalysts, these broad peaks are associated with a relatively sharp peak at about 23.6°. An amorphous DMC catalyst would have very broad peaks (FWHM>4°) that are not associated with any sharp peaks. The DMC catalysts of FIGS. 1 and 2 are crystalline. Some of these catalysts may be poorly crystalline, but they are not amorphous. For the DMC catalysts shown in FIG. 2, the observation of twelve separate diffraction peaks, many with FWHM less than 2°, indicates that these DMC catalysts are crystalline, not amorphous.

The characterization of the DMC catalyst in U.S. Pat. No. 5,712,216 as "substantially amorphous", i.e., "substantially noncrystalline, lacking a well-defined crystal structure, or characterized by the substantial absence of sharp lines in the X-ray diffraction (XRD) pattern" (1. 66, col. 3–1. 3, col. 4) is thus technically incorrect. Further, the PXRD patterns for three different DMC catalysts using t-BuOH as complexing agent differ very little (see FIG. 2). Take, for instance, the PXRD labeled as "U.S. Pat. No. 5,712,216 25% cubic". In U.S. Pat. No. 5,712,216, this catalyst is described as "substantially amorphous, 25% crystalline". The PXRD for this catalyst is essentially identical to that labeled as "U.S. Pat. No. 5,712,216 Comparative Example 3 [Asahi]", and is very similar to that labeled "U.S. Pat. No. 5,627,122 Example 1" (and described therein as substantially crystalline). In fact, all five of the DMC catalysts illustrated in FIG. 2 have varying amounts of two crystalline phases—cubic and a second phase ("U1")—with the proportion of cubic phase dropping from greater than 99 weight percent to less than 1 weight percent. The U1 DMC crystalline phase of FIG. 2 is defined as having a combination of three peaks, as follows.

1. A sharp peak at 23.64±0.32 deg 2-theta [d=3.76±0.05 Å], with width FWHM<0.45 deg 2-theta.
2. A broad, asymmetric peak with a maximum at about 14.3±0.7 deg 2-theta [d=6.20±0.30 Å], rising sharply at low angle, and falling gradually at high angle, with width FWHM=1.5±0.6 deg 2-theta.
3. A broad peak with a maximum at about 18.4±1.1 deg 2-theta [d=4.84±0.30 Å] with width FWHM=1.6±0.8 deg 2-theta. This peak can also be asymmetric; in some cases rising gradually at low angle and falling sharply at high angle.

Two of these features are included as claims in U.S. Pat. No. 5,470,813 ("Arco substantially amorphous"): claim 24. "(d-spacing, angstroms): 4.82 (br), 3.76 (br)" [where br means broad]. All three features are present in the catalysts shown in FIG. 1 from this and subsequent patents from the assignee (U.S. Pat. Nos. 5,712,216 and 5,714,428). In addition, all three of these features are included in Table 1 of WO 99/19063. If the U1 crystalline phase is present, the XRPD contains all three of the above features, as shown in the top two XRPD of FIG. 3 for a DMC/t-BuOH/polyester catalyst (XRPD from WO 99/19063) and a DMC/t-BuOH/poly-PO catalyst:

| DMC/t-BuOH/polyester | DMC/t-BuOH/P4000 |
| --- | --- |
| 14.5°, d = 6.10 Å, FWHM = 1.3° | 14.67°, d = 6.03 Å, FWHM = 1.2° |
| 18.6°, d = 4.77 Å, FMHM = 1.4° | 18.28°, d = 4.85 Å, FMHM = 1.3° |
| 23.7°, d = 3.75 Å, FWHM = 0.4° | 23.61°, d = 3.77 Å, FWHM = 0.35° |

Cases that contain the sharp peak (23.6 deg 2-theta) plus broad, poorly-resolved features between 13.5 and 22.5 deg 2-theta are called U1A [see FIG. 3, bottom XRPD, for an alternative DMC/t-BuOH/poly-PO catalyst, and FIG. 5 herein, and FIG. 6 of U.S. Pat. No. 5,712,216]. U1A is related to U1, and its characteristic X-ray pattern can occur from a merging of peaks 2 and 3 due to a variety of factors taken singly or in combination, such as a narrowed splitting, increased asymmetries, and increased FWHM values. XRPD for DMC catalysts that contain either U1 and/or U1A crystal phases are given in FIGS. 1–3.

The difficulty in characterization of the structural forms of DMC catalysts was earlier recognized with those catalysts containing glyme as complexing agent. For instance, in R. J. Herold et al., Polym. Prepr., Amer. Chem. Soc., Div. Polym. Chem., "Hexacyanometallate Salt Complexes for Epoxide Polymerization" (1972) 13(1), 545–550, the authors describe DMC/glyme catalysts as "largely amorphous". On the other hand, J. Kuyper et. al., J. Catal, "Hexacyanometallate Salts Used as Alkene—Oxide Polymerization Catalysts and Molecular Sieves," (1987), 105(1), 163–174, describe DMC/glyme catalysts as crystalline by giving "fairly simple line patterns. Depending upon the preparative conditions (particularly during the isolation of the solid catalyst), at least three different, though similar, diffraction patterns are obtained. Unfortunately, no assignment of cell parameters was found." Both of these references fail to provide XRPD data. Kuyper reported that attempts to index the XRPD were unsuccessful. The detailed crystal structure of the DMC/glyme catalyst of Kuyper remains unknown; to date the unit cell parameters and atomic coordinates have not been published.

As part of the work described herein, several DMC/glyme catalysts were synthesized using procedures set forth both in Kuyper (Shell) and also in Herold (General Tire). The XRPD for these catalysts were measured (a typical case is set forth as the lowermost XRPD in FIG. 4). Surprisingly, Shell DMC/glyme procedures (using HCl) and General Tire DMC/glyme procedures (using acid ion exchange) were identified that gave catalysts that have nearly identical XRPD patterns; i.e., both give the XRPD pattern shown at the bottom of FIG. 4. In addition, this XRPD pattern is very similar to that shown in U.S. Pat. No. 5,712,216 (Arco; see FIG. 2 of this patent), termed as a "conventional DMC catalyst". Computational indexing of the XRPD pattern was carried out using commercial software [MDI Jade software for pattern analysis and phase identification; http://www.materialsdata.com/products.htm]. Computational indexing requires that either the sample is a single crystalline phase, or that overlapping multiphase peaks (as shown in FIG. 4) can be separated into peaks for separate crystalline phases. For selected DMC/glyme catalysts, no substantial impurity peaks could be identified from multiple samples using standard techniques (see Cullity, Chapter 9). As determined by PXRD, the DMC/glyme catalyst of FIG. 4 does not contain any detectable amounts of the known cubic DMC (hydrated) or rhombohedral DMC (dehydrated) crystal phases (see below), nor does it contain any detectable amount of U1 or U1A. Using Jade, the peaks for this catalyst were indexed to a monoclinic unit cell with cell parameters (a, b, c)=(12.85, 7.61, 9.84 Å); β=107.6 Å.

Of interest, the XRPD pattern in FIG. 4 for the DMC/glyme catalyst is similar to FIG. 2 of U.S. Pat. No. 5,712,216, termed as a "conventional DMC catalyst". WO 99/16775 further reports an additional crystalline DMC catalyst that is also monoclinic.

Hydrated cubic DMC of the prior art contains no excess Zn nor complexing agent. It has the formula $Zn_{1.5}Co(CN)_6 \cdot 6H_2O$. Hydrated, cubic DMC is set forth as the topmost XRPD in FIG. 4. Partially dehydrated DMC, illustrated as the middle XRPD in FIG. 4, also contains no excess Zn and consists of a mixture of cubic and rhombohedral phases. It has the formula $Zn_{1.5}Co(CN)_6 \cdot xH_2O$, $1 \leq x \leq 4$. It may easily be made by simple variations of known procedures for making cubic DMC, such as by combination of starting materials, filtration and drying.

The difficulty in characterizing DMC catalysts was recently noted in WO99/16775 where the applicant states that "[DMC catalysts] as a rule are hard to characterize by x-ray methods, not very crystalline and in part, also radiographically amorphous compounds, or crystalline . . . with a cubic structure." The applicant further claims a "crystalline monoclinic DMC catalyst", as well as two additional crystalline DMC catalysts that are neither cubic, nor amorphous, nor well understood based on XRPD.

In summary, DMC catalysts have been described both as "amorphous" and as "crystalline." In so doing, the term "amorphous" has taken on an incorrect meaning as the XRPD pattern continues to be misunderstood or alternatively is too complicated to comprehend.

There exists a need for improved double metal cyanide catalysts, especially catalysts which are easy to prepare and isolate, and exhibit excellent polymerization activity. Further, such catalysts preferably render polyether polyols having a narrow molecular weight distribution and low unsaturation.

SUMMARY OF THE INVENTION

The invention relates to an improved double metal cyanide ("DMC") complex useful as a catalyst in epoxide polymerization. The catalysts of the invention show significant activity for different types of crystal structures or mixtures of crystal structures. The invention further includes methods for preparing the novel complexes and the polyether polyol products produced therefrom. In particular, the catalysts of the invention render a polyol having low unsaturation.

The complexes are prepared by reacting an aqueous solution of a metal salt and a metal cyanide salt in the presence of the organic complexing agent. Preferred multifunctional complexing agents are those of the formula:

$$R_1O(CH_2CHR_2O)_xH \quad (I)$$

and mixtures thereof, wherein:
  x is 1, 2, or 3;
  $R_1$ is a $C_1$–$C_4$ alkyl group; and
  $R_2$ is —H or a —$CH_3$ group.
Such multifunctional complexing agents render unnecessary any need for use of functionalized polymers as secondary complexing agents. Preferred multifunctional primary complexing agents are the glycol ethers, such as alkyl ether of propylene glycol ("PG"), dipropylene glycol ("DPG"), tripropylene glycol ("TPG") and similarly the alkyl ethers of ethylene glycol ("EG"), diethylene glycol ("DEG") and triethylene glycol ("TEG"). The term "alkyl" refers to methyl, ethyl, propyl, isopropyl, butyl, isobutyl, and t-butyl. In place of one or more alkyl groups in such complexing agent, a $C_6$–$C_{23}$ aryl group may further be employed. The choice of alkyl group may be determined by the miscibility of the complexing agent in water. Additionally, even polybutylene glycol derivatives with shorter chain alkyl groups for the ether are appropriate complexing agents.

Catalysts of the invention are DMC crystalline phases or mixtures of such phases, including monoclinic, orthorhombic, cubic, U1, and U1A crystalline phases, as determined by XRPD. Some of the catalysts contain no detectable amount of the cubic, U1, or U1A DMC crystalline phases.

Some of the catalysts contain a crystalline impurity of approximate composition $Zn_5(OH)_8Cl_2 \cdot H_2O$, known as simonkolleite. This impurity is believed to be catalytically inert. The match was made using the database from the International Centre for Diffraction Data (ICDD; see Cullity, Chapter 9). The impurity can be indexed to a hexagonal unit cell with approximate parameters (a,c)=(6.325, 23.60 Å). These parameters are in good agreement with that reported for simonkolleite: (a,c)=(6.334, 23.58 Å) and (6.34, 23.64 Å). The assignment is confirmed by matching the intensity pattern. See: Hesse, F. R. G. Schmetzer, K.; Schnorrer-Koehler, G.; Medenbach, 0. Neues Jahrb. Mineral., Monatsh. (1985), (4), 145–54. CAN 102:223561 Wulfingite, epsilon-Zn(OH)2, and simonkolleite, $Zn_5(OH)_8Cl_2 \cdot H_2O$, two new minerals from Richelsdorf. Also see Allmann, R. Z. Kristallogr. (1968), 126(5–6), 417–26. CAN 69:90890 Refinement of the structure of zinc hydroxide chloride, $Zn_5(OH)_8Cl_2 \cdot 1H_2O$.

An excess of the metal salt, as compared to the metal cyanide salt, is preferably used and the resulting DMC complex includes some of the metal salt. Typically, the DMC catalyst complex of the invention contains more than 0.2 mole of metal salt per mole of metal cyanide compound, for example Zn/Co>1.6.

Such catalyst complexes exhibit excellent activity for polymerizing epoxides even where there is no secondary complexing agent. The catalyst activities are significantly higher than the activities available from conventional KOH catalysts, and are also higher than those of ordinary DMC catalysts.

BRIEF DESCRIPTION OF THE DRAWINGS

FIGS. 1–10 show XRPD spectra (intensity vs. two-theta), including reference compounds, DMC catalysts from prior art, and DMC catalysts of the invention. In FIGS. 3–10, plotting symbols are used to mark the 2-theta positions of peaks calculated from unit cell parameters for a variety of crystalline phases, including cubic, rhombohedral, and monoclinic phases (these peaks are indexed). Peaks marked with square plotting symbols are for the second or third crystal phases [U1 or U1A]; these peaks are not indexed.

FIG. 1 sets forth the XRPD for amorphous silica along with the XRPDs for crystalline DMC catalysts set forth in U.S. Pat. Nos. 5,712,216 and 5,714,428.

FIG. 2 sets forth a cubic DMC compound of the prior art as well as crystalline DMC catalysts set forth in U.S. Pat. Nos. 5,712,216 and 5,627,122.

FIG. 3 shows XRPD for three DMC catalysts, as follows: (1) DMC/t-BuOH/polyester from WO 99/19063, (2) DMC/t-BuOH/P4000 with crystalline phase U1, and (3) DMC/t-BuOH/CP450 with crystal phase U1A.

FIG. 4 shows XRPD patterns for four crystalline DMC compounds, as follows: (1)A fully hydrated DMC compound (cubic), (2) a partially dehydrated DMC compound (cubic+rhombohedral), (3) a DMC/glyme catalyst (monoclinic) of the prior art, and (4) the DMC/t-BuOH/poly-PO catalyst of Comparative Example 3.

FIG. 5 shows the XRPD for six DMC/MTPG catalysts of the invention.

FIG. 6 shows XRPD for two DMC/MTEG catalysts of the invention.

FIG. 7 shows XRPD for three DMC/MDPG catalysts of the invention.

FIG. 8 shows XRPD for one DMC/MDEG catalysts of the invention.

FIG. 9 shows XRPD for four DMC/MPG catalysts of the invention.

FIG. 10 shows XRPD for a DMC/B EG catalyst of the invention.

DETAILED DESCRIPTION OF THE INVENTION

Figure 1:
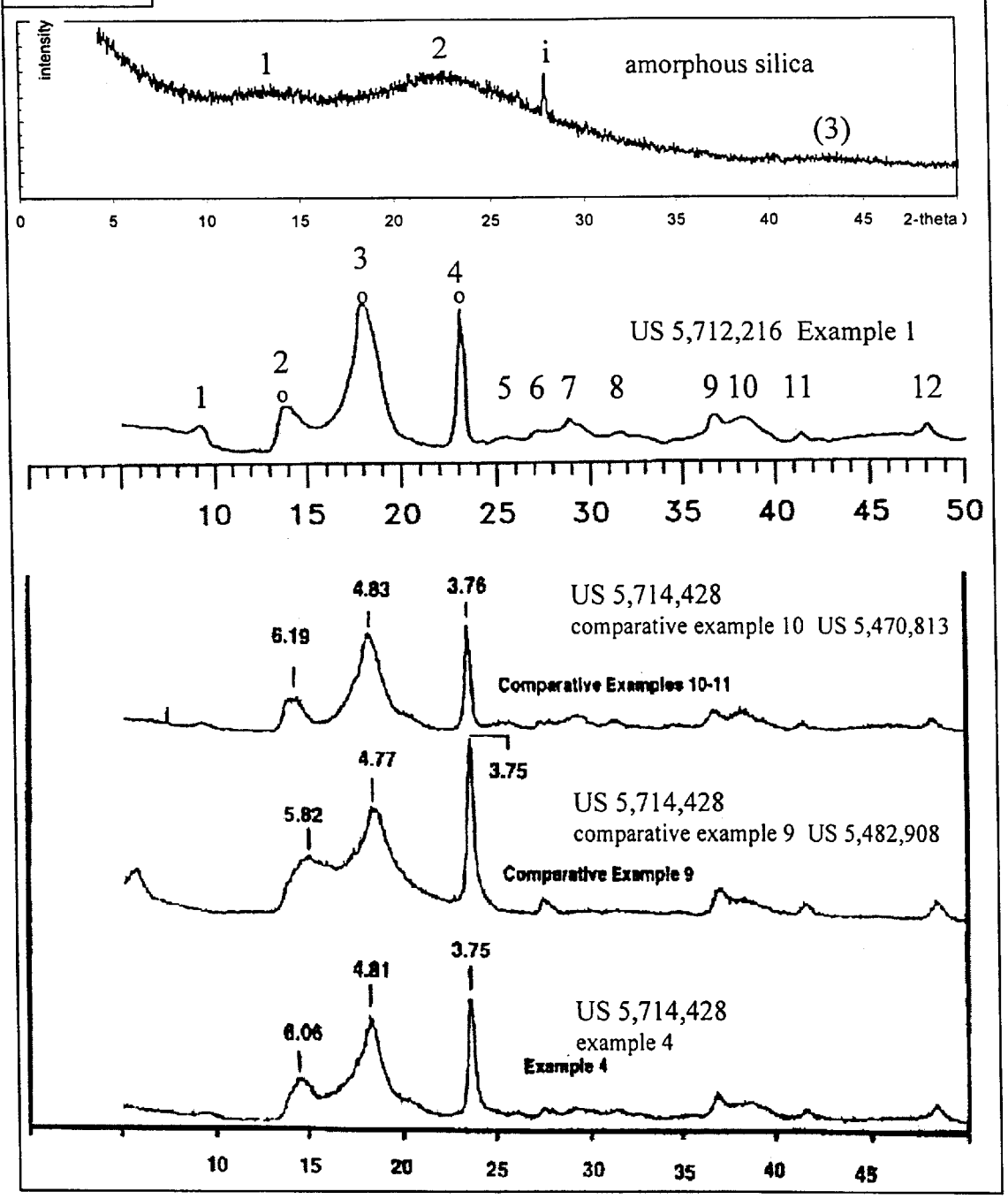
Figure 2:
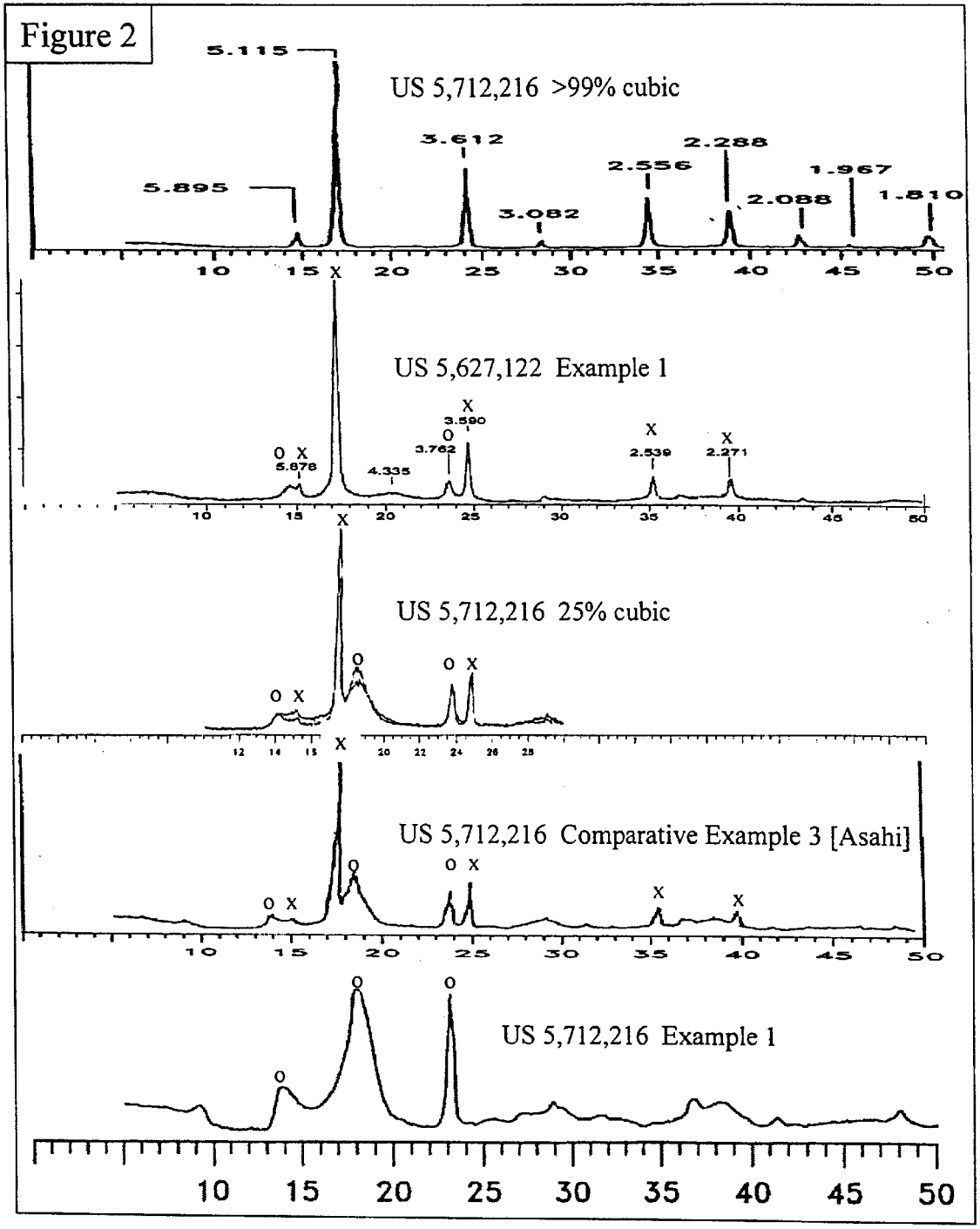
Figure 3:
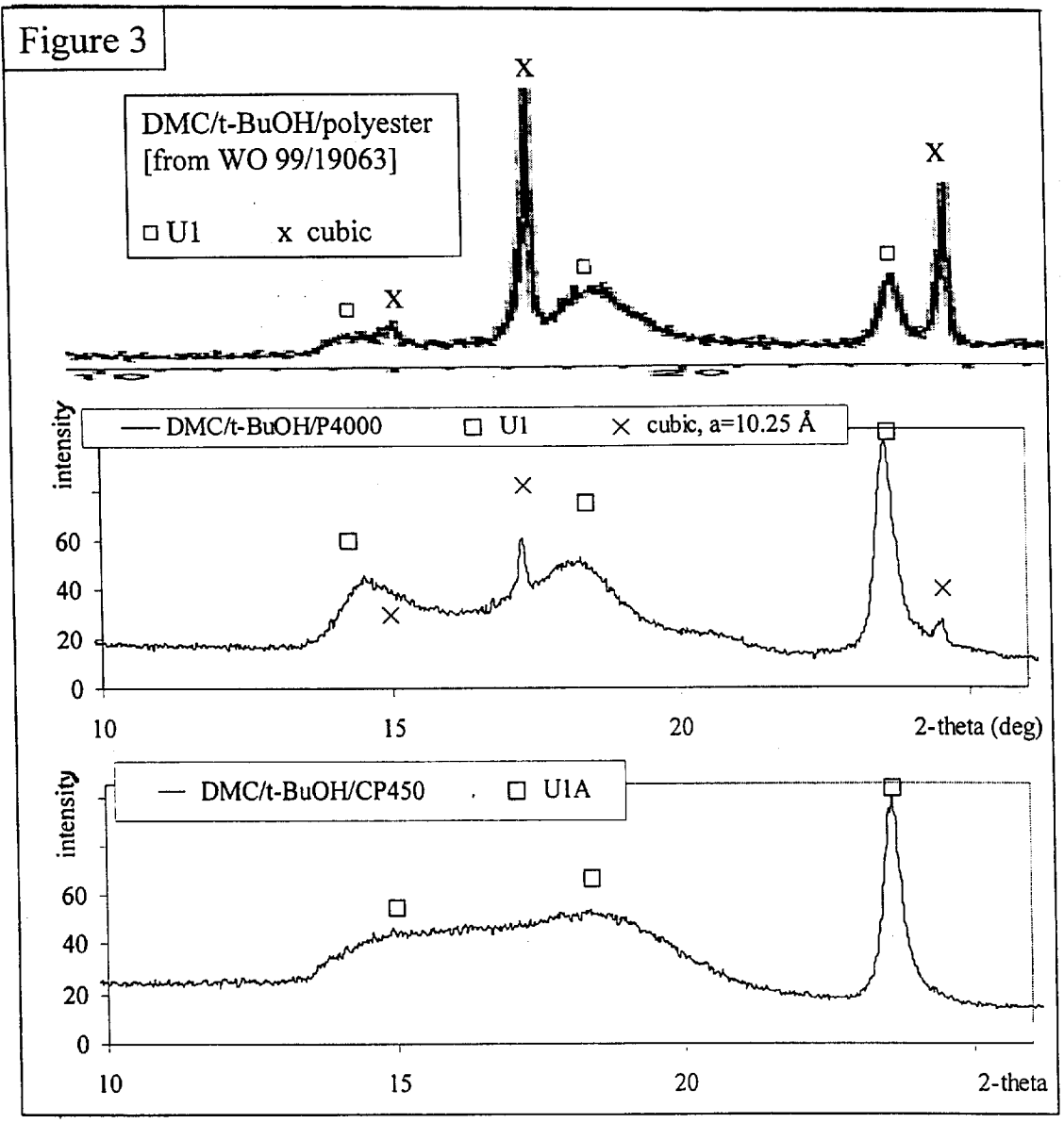

The double metal cyanide ("DMC") catalysts of the invention are the reaction products of a water-soluble metal salt, a water-soluble metal cyanide salt, and a multifunctional complexing agent.

The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is generally from 1 to 3 and satisfies the valency state of M. Examples of suitable metal salts include, but are not limited to, zinc chloride, zinc bromide, zinc formate, zinc acetate, zinc propionate, zinc acetonylacetate, zinc benzoate, zinc nitrate, iron(II) sulfate, iron(II) bromide, cobalt(II) chloride, cobalt(II) thiocyanate, nickel(II) formate, nickel(II) nitrate, and the like, and mixtures thereof. Zinc halides are preferred.

The water-soluble metal cyanide salts used to make the double metal cyanide compounds useful in the invention preferably have the general formula $(Y)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and similar salts.

Examples of double metal cyanide compounds that can be used in the invention include, for example, zinc hexacyanocobaltate(III), zinc hexacyanoferrate(III), zinc hexacyanoferrate(II), nickel(II) hexacyanoferrate(II), cobalt (II) hexacyanocobaltate(III), and the like. Further examples of suitable double metal cyanide compounds are listed in U.S. Pat. No. 5,158,922, which is incorporated herein by reference.

The catalysts of the invention are further derived from a multifunctional complexing agent containing at least one ether linkage and at least one —OH group. Generally, the complexing agent must be relatively soluble in water. The multifunctional complexing agent serves as the primary activating agent. Since the complexing agent is multifunctional, it may further function as a second activating complexing agent. As such the use of a secondary complexing agent is not required. The weight ratio of complexing agent:metal cyanide and the water-soluble salt is generally between from about 10 to about 80, preferably from about 15 to about 60, weight percent.

Preferred multifunctional complexing agents are those of the formula:

$$R_1O(CH_2CHR_2O)_xH \qquad (I)$$

and mixtures thereof, wherein:

x is 1, 2, or 3;

$R_1$ is a $C_1$–$C_4$ alkyl group; and $R_2$ is —H or a —CH$_3$ group.

Included within this group of compounds are the glycol ethers such as methyl ether of propylene glycol ("MPG"), dipropylene glycol ("MDPG"), tripropylene glycol ("MTPG"), and similarly the methyl ethers of ethylene glycol ("MEG"), diethylene glycol ("MDEG"), and triethylene glycol ("MTEG"). Other alkyl groups besides methyl can also be used with any of the polyethylene and polypropylene glycols as long as the derivative is for the most part miscible in water. Suitable alkyl groups include ethyl, propyl, isopropyl, butyl, isobutyl, t-butyl, and phenyl etc. Mixtures of these glycol ethers could also be used as the complexing agent.

Since the complexing agents of the invention are multifunctional, it is unnecessary to use a secondary complexing agent. One of skill in the art will recognize the possibility of using a secondary complexing agent if it is desired however suitable as secondary complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is particularly preferred.

When employed, the preferred catalysts include from about 10 to about 70 wt. % of the secondary complexing agent, most preferred catalysts include from about 15 to about 60 wt. %.

Polyethers can also be used as a secondary complexing agent. Suitable polyethers include those produced by ring-opening polymerization of cyclic ethers, and include epoxide polymers, oxetane polymers, tetrahydrofuran polymers, and the like. Any method of catalysis can be used to make the polyethers. The polyethers can have any desired end groups, including, for example, hydroxyl, amine, ester, ether, or the like. Preferred polyethers are polyether polyols having average hydroxyl functionalities from about 2 to about 8 and number average molecular weights within the range of about 1000 to about 10,000, more preferably from about 1000 to about 5000. These are usually made by polymerizing epoxides in the presence of active hydrogen-containing initiators and basic, acidic, or organometallic catalysts (including DMC catalysts). Useful polyether polyols include poly(oxypropylene) polyols, EO-capped poly(oxypropylene) polyols, mixed EO-PO polyols, butylene oxide polymers, butylene oxide copolymers with ethylene oxide and/or propylene oxide, polytetramethylene ether glycols, and the like. Polyethylene glycols can also be useful as secondary complexing agents.

While not necessary, the catalysts of the invention may also contain a functionalized polymer as a secondary complexing agent. Suitable secondary complexing agents include polyesters, polycarbonates, polyethers, an alkyl glucoside, a glycidol capped polyol, a polyalkylene sorbitan ester, a polyvalent carboxylic acid ester, a bile acid or its salt ester or amide as well as ionic surface or interface active compounds and one or more cyclodextrins. Such secondary complexing agents are disclosed in WO/0007720; WO/0007721; WO/0015336; WO/0015337; WO/0047649; WO/0047650, and U.S. Pat. No. 6,204,357 herein incorporated by reference. Additionally, the secondary complexing agent may be either a lactam or a lactone, such as those disclosed in U.S. Pat. No. 6,013,596, herein incorporated by reference.

The complexing agent is added either during preparation or immediately following precipitation of the catalyst. Usually, an excess amount of the complexing agent is used. The conventional method of preparing DMC compounds useful for epoxide polymerization is fully described in many references, including U.S. Pat. Nos. 5,158,922, 4,843,054, 4,477,589, 3,427,335, 3,427,334, 3,427,256, 3,278,457, and 3,941,849, and Japanese Pat. Appl. Kokai No. 4-145123. The teachings of these references related to conventional catalyst preparation and suitable DMC compounds are incorporated herein by reference in their entirety.

The catalyst complex of the invention may exhibit numerous crystal phases, including monoclinic, orthorhombic, cubic and U1, and third ("U1A") phases and mixtures thereof as determined by XRPD. In addition to high activities, the catalysts of the invention give polyether polyol products having an exceptionally low level of unsaturation. The value of low-unsaturation polyols for making polyurethanes with excellent physical properties is well documented.

The invention includes further methods for making the highly active DMC complex catalysts. In the method, the DMC catalyst of the invention is prepared by intimately combining and reacting an aqueous solution of a metal salt and a metal cyanide salt in the presence of or followed by the addition of an organic complexing agent, usually with high-shear or intensive mixing of the reactants. The methods of the invention vary these approaches, however, to render crystalline DMC catalysts. An excess of the metal salt, as compared to the metal cyanide salt, is preferably used and the resulting DMC complex includes some of the metal salt. Typically, the DMC catalyst complex of the invention contains more than 0.2 mole of water-soluble salt per mole of metal cyanide compound, for example giving a mole fraction $Zn/Co>1.6$.

The invention includes a process for making a polyether polymer. This process comprises polymerizing an epoxide in the presence of a double metal cyanide catalyst composition of the invention. Preferred epoxides are ethylene oxide, propylene oxide, butene oxides, styrene oxide, and the like, and mixtures thereof. The process can be used to make random or block copolymers. The polyether polymer is preferably a polyether polyol made by polymerizing an epoxide in the presence of a hydroxyl group-containing initiator.

Other monomers that will copolymerize with an epoxide in the presence of a DMC compound can be included in the process of the invention to make other types of epoxide polymers. Any of the copolymers known in the art made using conventional DMC catalysts can be made with the catalysts of the invention. For example, epoxides copolymerize with oxetanes, as disclosed in U.S. Pat. Nos. 3,278,457 and 3,404,109, to give polyethers, or with anhydrides, as disclosed in U.S. Pat. Nos. 5,145,883 and 3,538,043, to give polyester or polyetherester polyols. The preparation of polyether, polyester, and polyetherester polyols using double metal cyanide catalysts is fully described, for example, in U.S. Pat. Nos. 5,223,583, 5,145,883, 4,472,560, 3,941,849, 3,900,518, 3,538,043, 3,404,109, 3,278,458, 3,278,457, and in J. L. Schuchardt and S. D. Harper, SPI Proceedings, 32nd Annual Polyurethane Tech./Market. Conf. 360 (1989). The polyol synthesis using DMC catalysts in these references are incorporated by reference in their entirety.

The DMC catalysts of the invention are highly active. A consequence of higher polymerization rates is that polyol producers can use less of the relatively expensive DMC catalyst and save money. More active catalysts also permit the producer to reduce batch times and increase productivity. In addition, the catalysts of the invention are often active enough to allow their use at very low concentrations, such as 25 ppm or less. At such low concentrations, the catalyst can often be left in the polyether polyol without an adverse effect on product quality. The ability to leave catalysts in the polyol is an important advantage because commercial polyols currently require a catalyst removal step. Polyether polyols prepared using the catalysts of the invention have exceptionally low unsaturation, consistently less than about 0.015 meq/g.

Polyether polyols made with the catalysts of the invention preferably have average hydroxyl functionalities from about 2 to 8, more preferably from about 2 to 6, and most preferably from about 2 to 3. The polyols preferably have number average molecular weights within the range of about 200 to about 50,000. A more preferred range is from about 1,000 to about 12,000; most preferred is the range from about 2,000 to about 8,000.

EXAMPLES

The following examples merely illustrate the invention. Those skilled in the art will recognize many variations that are within the spirit of the invention and scope of the claims. Examples 1–6 and Comparative Examples 1 and 3 were prepared using one of two alternative processes relative to the amounts of the zinc chloride and potassium cyanocobaltate starting materials, the methods of ligation, and the methods of agitation. Examples 1 and 2 are catalysts prepared by the procedure set forth in Comparative Example 3. This procedure was previously reported to render crystalline catalysts. This procedure utilizes a high speed dispersator (Ser # E2899S—Premier Mill Corp.) with a 2 inch diameter circular dispersion blade. The dispersator is capable of achieving speeds of up to 15,000 rpm. Examples, 3, 4, 5 and 6 are catalysts prepared by the procedure set forth in Comparative Example 1. This procedure was previously reported to render amorphous catalysts. Comparative Example 2 is a DMC/t-BuOH/poly-PO catalyst prepared using the procedure from U.S. Pat. No. 5,482,908 (Example 1) and is reported to produce a very active catalyst. Comparative Example 4 is a DMC salt prepared with no complexing agent. Comparative Example 5 is a catalyst prepared using a method from U.S. Pat. No. 4,477,589, issued to Shell. Examples 7–24 are catalyst activity runs using catalysts prepared with the complexing agents of the invention as well as runs comparing the activities to the reportedly active catalysts from the comparative examples (except Comparative Example 4 which was produced for comparative XRPD). Examples 25–31 are catalyst preparations based on MTPG as complexing agent. The series starts with a rerun of the procedure used to prepare the catalyst of Example 1 with subsequent preparations adding more intensive mixing conditions. Examples 32–44 are catalyst preparations with different complexing agents. Lastly, Examples 45–76 are activity runs corresponding to the catalysts from the preceding examples. Those skilled in the art will recognize many variations that are within the spirit of the invention and scope of the claims.

Elemental analysis was carried out on several of the samples of the inventions, as listed in the examples. Samples were analyzed in duplicate or triplicate lots. For most cases, the expected relative error for Zn, Co, Cl, C, H, N is ±3% [as an example carbon 38.6±1.2 wt. %]. Potassium occurs at relatively low levels (generally less than 0.60±0.06 wt %). Oxygen was obtained by subtraction. Formulas were assigned assuming a mole fraction of CN/Co=6.0 (assumed no additional CN or HCN was present).

Elemental analysis for K, Zn, Co, and Cl was obtained by neutron activation analysis, as described in Rigot, W. L.; Buchmann, M. E.; Quinn, T. J.; Romick, J. D.; Yusuf, S. O., J. Radioanal. Nucl. Chem. (2000), 243(1), 205–208. Neutron activation analysis (NAA) is a technique based on the measurement of gamma radiation emitted following the activation of stable isotopes in a neutron field. For these determinations the neutron source was The DOW TRIGA nuclear reactor, which is licensed to operate at a maximum power level of 300 kilowatts. The process involves sample preparation which for these samples required transferring aliquots (20 to 50 mg) to polyethylene vials adding approximately 1 grams of ultrapure graphite and mixing, until homogeneous. Standards were prepared by transferring known volumes from certified stock solutions to polyethylene vials and diluting with water. Samples and standards were irradiated in the reactor for 10 minutes at a power level of 100 kilowatts. After a short delay, samples and standards were removed from the reactor and spectra of the emitted gamma radiation were acquired for 400 seconds using two high purity germanium detectors interfaced to a computer based multichannel analyzer (MCA). After an additional delay of approximately 6 hours, a second acquisition was performed for 4000 seconds. Data reduction was performed using standard comparative techniques. Nuclear reactions, as well as nuclear properties for these determinations, are listed below.

| Reaction | Half-Life | Gamma Ray Energy (KeV) |
|---|---|---|
| $^{59}Co(n,\gamma)^{60}Co$ | 5.27 Years | 11173, 1332 |
| $^{68}Zn(n,\gamma)^{69m}Zn$ | 13.9 Hours | 438 |
| $^{41}K(n,\gamma)^{42}K$ | 12.4 Hours | 1525 |
| $^{37}Cl(n,\gamma)^{38}Cl$ | 37.3 Minutes | 1642, 2167 |

Elemental analysis for C, H and N was performed by combustion analysis, on a LECO CHNS932 Analyzer serial #3160. Samples were weighed on Sartorius M2P Microbalance serial #70101247. The analysis constants for the analyzer are listed below.

| Analysis Elements | CHN |
|---|---|
| Linearization | Cubic |
| Oxidation Furnace Temp | 1000 |
| Reduction Furnace Temp | 650 |
| Sample Drop Delay Time | 5 |
| Analysis Flow (cc/min) | 180 |
| Carbon Minimum Timeout | 100 |
| Carbon Delay Time | 6 |
| Carbon Comparator Level | 1.00 |
| Hydrogen Minimum Timeout | 180 |
| Hydrogen Delay Time | 5 |
| Hydrogen Comparator Level | 1.00 |
| Nitrogen Minimum Timeout | 100 |
| Nitrogen Delay Time | 36 |
| Nitrogen Comparator Level | 1.00 |
| Oxygen Dose #1 (cc/min) | 20 |
| Delay Dose #2 (sec) | 2 |
| Oxygen Dose #2 (cc/min) | 10 |

Several examples were analyzed for only cobalt and zinc. In these cases, samples were prepared by using three different acid digestion procedures, and analyzed using a Perkin Elmer Plasma 40 Spectrometer (ICP) and a Perkin Elmer 3030B Atomic Absorption Spectrometer.

Powder x-ray diffraction (XRPD) analysis was carried out using two methods from different labs. In some cases, samples were analyzed by both methods. In these cases, similar results were obtained. In the first method, experimental conditions were chosen to match those described in Table 1 of U.S. Pat. No. 5,470,813, except that the counting time was increased to give higher quality data (reduce noise). Here, XRPD was carried out on a Siemens D500 Kristalloflex diffractometer. Samples were analyzed using monochromatized CuKα1 radiation (λ=1.54059 Å) at 40 kV and 30 mA. Slit sizes were 1° (for the divergence slit), 0.05° (for the monochrometer slit) and 0.15° (for the detector slit). XRPD data were collected from 10° to 70° 2θ with a step size of 0.02° 2θ and a counting time of 3–6 seconds per step. In the second method, XRPD was collected using a Siemens D500 Kristalloflex automated powder diffractometer equipped with a Co X-ray tube source, primary beam monocrometer, and a position sensitive detector (PSD). The incident beam was collimated using a 1° divergence slit. The tube was operated at 35 kV and 30 mA, and the sample was illuminated with CoKα1 radiation (λ=1.78897 Å). Samples were mounted on zero-background single-crystal quartz sample holders having a cavity depth of 0.5 mm. XRPD data were collected from 5° to 90°2θ with a step size of 0.02° 2θ at a rate of 0.5° 2θ per minute. In the second method, PXRD was collected using a Siemens D500 Kristalloflex automated powder diffractometer equipped with a Co X-ray tube source, primary beam monocrometer, and a position sensitive detector (PSD). The incident beam was collimated using a 1° divergence slit. The tube was operated at 35 kV and 30 mA, and the sample was illuminated with CoKα1 radiation (λ=1.78897 Å). Samples were mounted on zero-background single-crystal quartz sample holders having a cavity depth of 0.5 mm. PXRD data were collected from 5° to 90° 2θ with a step size of 0.02° 2θ at a rate of 0.5° 2θ per minute. The sensitivity, as measured by the effective counting time, is roughly 25–50 times greater than that of method one. This increased sensitivity is due primarily to the PSD, which serves as a linear array of simultaneous detectors, thus increasing the counting time for each 2θ step by a factor of 250 (the PSD window is open to about 5° 2θ). Data was converted from CoKα1 to CuKα1 using the Jade software package described earlier. When converted to CuKα1, PXRD data covered a range of 4.3° to 75.0°2θ with a step size of 0.0116° 2θ.

Example 1

Preparation of DMC catalyst with tri(propylene glycol) monomethyl ether as Complexing Agent 12.5 g (91.5 mmole) of $ZnCl_2$ dissolved in 20 ml of distilled water was added under strong stirring (about 12,000 rpm) to a solution of 4.0 g (12 mmole) of potassium hexacyanocobaltate in 70 ml water. Immediately after mixing, 50 g of tri(propylene glycol) monomethyl ether in 50 g distilled water was added to the suspension and stirred for 10 min at 4,000 rpm. Then 100 g of distilled water was added and stirring continued for another 3 min at 4,000 rpm. The solids were filtered using a filter press and 0.45 micron nylon filter at 30 psi pressure. The filtration took about 5 min. Next the solids were resuspended in a mixture of 70 g of tri(propylene glycol) monomethyl ether in 30 g distilled water and the mixture stirred for 10 min at 10,000 rpm. This mixture was filtered as above in about 28 min. Once again the solids were resuspended in 100 g of tri(propylene glycol) monomethyl ether and stirred for 10 min at 8,000 rpm and filtered as above (about 80 psi) in about 50 min. The wet catalyst (about 13.3 g) was placed in an air circulating oven at 50–60° C. and dried to constant weight of 6.8 g. Elemental analysis indicated 6.2 wt. % Co and 14.0 wt. % Zn giving a mole ratio Zn/Co=2.04. XRPD, shown in FIG. 5, indicates a mixture of the U1A, cubic, and $Zn_5(OH)_8Cl_2 \cdot H_2O$ crystalline phases.

Example 2

Preparation of DMC catalyst with di(propylene glycol) monomethyl ether as Complexing Agent 12.5 g (91.5 mmole) of $ZnCl_2$ dissolved in 20 ml of distilled water was added under strong stirring (about 10,000 rpm) to a solution of 4.0 g (12 mmole) of potassium hexacyanocobaltate in 70 ml water. Immediately after mixing, 50 g of di(propylene glycol) methyl ether in 50 g distilled water was added to the suspension and stirred for 10 min at 10,000 rpm. Then 100 g of distilled water was added and stirring continued for another 3 min at 2,500 rpm. The solids were filtered using a filter press and 0.45 micron nylon filter at 40 psi pressure. The filtration took about 10 min. Next the solids were resuspended in a mixture of 70 g of di(propylene glycol) monomethyl ether in 30 g distilled water and the mixture stirred for 2 min in a blender set to the pulse mode. This mixture after rinsing the blender with 35 g of di(propylene glycol) methyl ether in 15 g distilled water was filtered as above in about 1 hr 30 min. Once again the solids were resuspended in 100 ml of di(propylene glycol) monomethyl ether and stirred for 2 min in the blender at pulse mode and filtered, after first rinsing the blender with 30 g of di(propylene glycol) methyl ether, as above (about 60 psi) in about 20 min. The wet catalyst (about 22.5 g) was placed in an air-circulating oven at 50–60° C. and dried to constant weight of 5.4 g. Elemental analysis indicated 10.5 wt. % Co and 24.0 wt. % Zn giving a mole ratio Zn/Co=2.05. XRPD, shown in FIG. 7, indicates a mixture of the U1A, cubic, and $Zn_5(OH)_8Cl_2 \cdot H_2O$ crystalline phases.

Comparative Example 1

Preparation of DMC catalyst with t-BuOH Complexing Agent

The procedure of U.S. Pat. No. 5,712,216, Example # 8 was followed with slight modification. A solution of 15 g (0.0452 mole) of $K_3Co(CN)_6$ in 200 ml of distilled water ("solution 1") was prepared. A solution of 15 g (0.11 mole) $ZnCl_2$ in 250 ml of distilled water and 15 g t-BuOH ("solution 2") was prepared. Solution 2 was poured into a 1l round bottom flask and heated with stirring to 30° C. Next solution 1 was added dropwise with stirring over 20 min. The mixture was stirred for another 30 min at 30° C. The reaction mixture was filtered in a filter press (40 psi) with a 0.45 micron nylon filter. The filtration took about 85 min. The solids were resuspended in 400 g of t-BuOH and 200 g distilled water and the mixture stirred for 30 min at 30° C. The solids were refiltered overnight as above at 50 psi. The filter cake was suspended in 144 g t-BuOH and stirred for 30 min at 30° C. The solids were refiltered in about 3.5 hr at 50 psi. The filter cake was placed in an air circulating drying oven for 2.5 hr at 45° C. yielding 13.7 g of dry catalyst.

Example 3

Preparation of DMC catalyst with tri(propylene glycol) monomethyl ether Complexing Agent A solution of 15 g (0.0452 mole) of $K_3Co(CN)_6$ in 200 ml of distilled water ("Solution 1") was prepared. A solution of 15 g (0.11 mole) $ZnCl_2$ in 250 ml of distilled water and 38.5 g tri(propylene glycol) monomethyl ether ("Solution 2") was prepared. Solution 2 was poured into a 1l round bottom flask and heated with stirring to 30° C. Next Solution 1 was added drop-wise with stirring over 20 min. The mixture was stirred for another 30 min at 30° C. The reaction mixture was filtered in a filter press (40 psi) with a 0.45 micron nylon filter. The filtration took about 1 hr and 40 min. The solids were resuspended in 400 g of tri(propylene glycol) monomethyl ether and 200 g distilled water and the mixture stirred for 30 min at 30° C. The solids were refiltered over 48 hr as above at 40–50 psi. The filter cake was suspended in 140 g tri(propylene glycol) monomethyl ether and stirred for 60 min at 30° C. Lumps of catalyst were sticking to the walls of the flask. The solids were poured into the filter press and an additional 100 g tri(propylene glycol) monomethyl ether was added to the flask and the remaining solids poured into a blender and mixed for a few min and this was also added to the filter press. The filtration was difficult and took over 4 hr at 50 psi. The filter cake was placed in an air circulating drying oven for several weeks at 54° C. yielding about 17 g of dry catalyst. The dried catalyst corresponds to the formula $Zn_{2.3}Cl_{1.0}(OH)_{0.6}Co(CN)_6 \cdot 1.1 MTPG \cdot 0.7H_2O$, the analytical data (elemental analysis) being as follows (calculated values in brackets):

| | | |
|---|---|---|
| K | 0.16 | (0.0) |
| Zn | 22.6 | (23.1) |
| Co | 8.8 | (9.1) |
| Cl | 5.4 | (5.4) |
| N | 13.9 | (12.9) |
| C | 30.9 | (31.4) |
| H | 4.0 | (4.1) |
| O | 14.2 | (14.0) |

Figure 5:
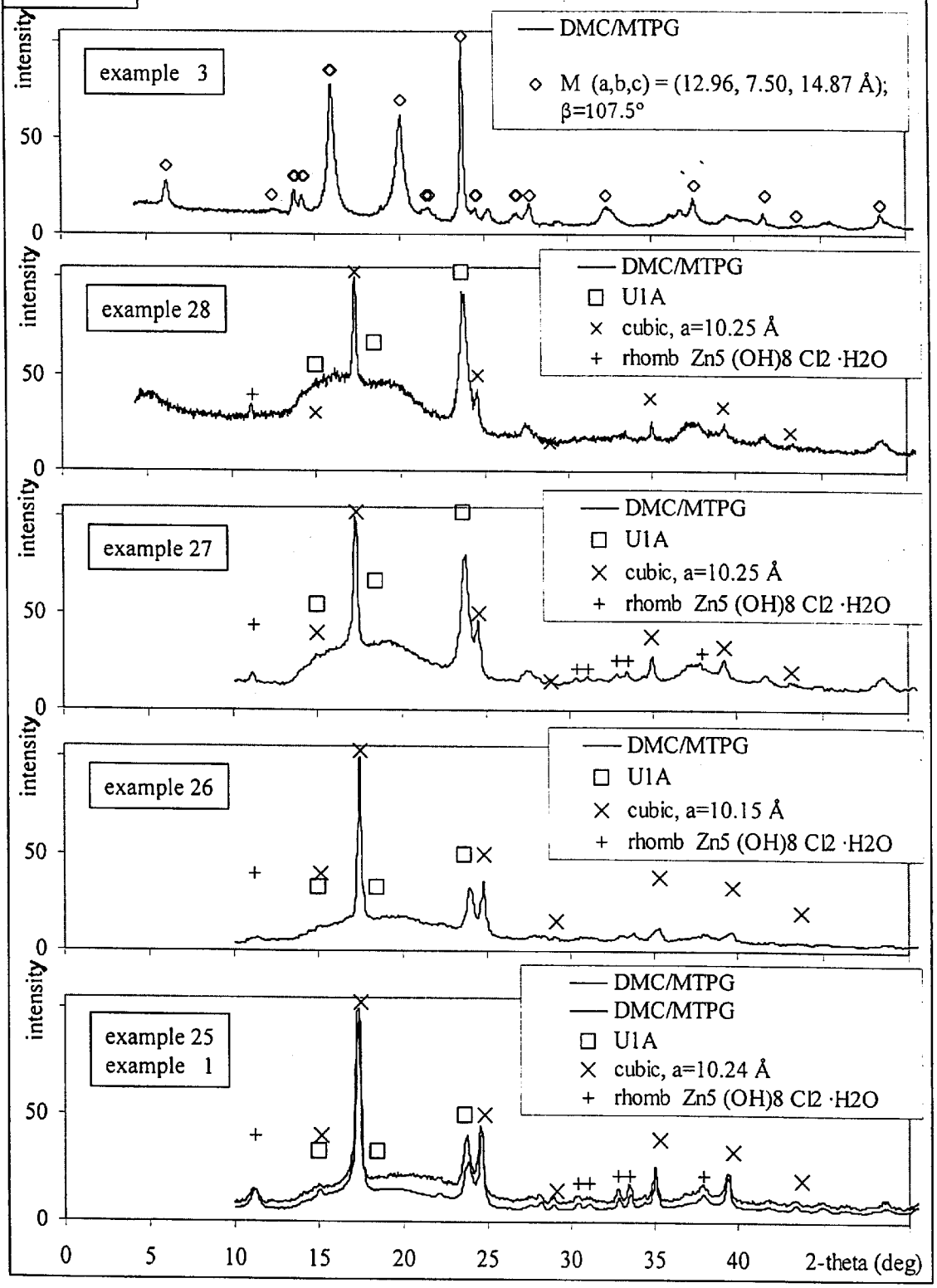

XRPD, shown in FIG. 5, indicates monoclinic DMC catalyst, with no detectable amounts of U1, U1A, cubic, or $Zn_5(OH)_8Cl_2 \cdot H_2O$. Computational indexing gave monoclinic cell parameters (a,b,c)=(12.96, 7.50, 14.87 Å); $\beta$=107.5°.

Example 4

Preparation of DMC catalyst with tri(ethylene glycol) monomethyl ether as Complexing Agent A solution of 15 g (0.0452 mole) of $K_3Co(CN)_6$ in 200 ml of distilled water ("Solution 1") was prepared. A solution of 15 g (0.11 mole) $ZnCl_2$ in 250 ml of distilled water and 32.8 g tri(ethylene glycol) monomethyl ether ("Solution 2") was prepared. Solution 2 was poured into a 1l round bottom flask and heated with stirring to 30° C. Next Solution 1 was added drop-wise with stirring over 20 min. The mixture was stirred for another 30 min at 30° C. The reaction mixture was filtered in a filter press (60 psi) with a 0.45 micron nylon filter. The filtration took about 15 min. The solids were resuspended in 400 g of tri(ethylene glycol) monomethyl ether and 200 g distilled water and the mixture stirred mechanically for 30 min at 30° C. Some pieces of catalyst did not break up so the whole mixture was placed in the warring blender and stirred until uniform. The solids were refiltered over 48 hr as above at 80 psi. The filter cake was suspended in 140 g tri(ethylene glycol) monomethyl ether and stirred in the warring blender for 5 min at 30° C. The solids were poured into the filter press (80 psi) and the filter was heated to 40–50° C. to effect filtration. The filtration occurred over one night. The filter cake (about 36 g) was placed in an air circulating drying oven at 50–55° C. for several days yielding about 27.6 g of dry catalyst. The results correspond to the formula $Zn_{2.1}Cl_{0.55}(OH)_{0.65}Co(CN)_6 \cdot 2.6\ MTPG \cdot 0.2\ H_2O$, the analytical data (elemental analysis) being as follows (calculated values in brackets):

| | | |
|---|---|---|
| K | 0.06 | (0.0) |
| Zn | 16.4 | (16.9) |
| Co | 7.1 | (7.2) |
| Cl | 2.4 | (2.4) |
| N | 10.8 | (10.3) |
| C | 35.8 | (35.7) |
| H | 5.2 | (5.3) |
| O | 22.3 | (22.1) |

XRPD, shown in FIG. 6 gave no detectable amounts of U1, U1A, cubic, or $Zn_5(OH)_8Cl_2 \cdot H_2O$. Computational indexing was inconclusive.

Example 5

Preparation of DMC catalyst with di(propylene glycol) monomethyl ether as Complexing Agent A solution of 15 g (0.0452 mole) of $K_3Co(CN)_6$ in 200 ml of distilled water ("Solution 1") was prepared. A solution of 15 g (0.11 mole) $ZnCl_2$ in 250 ml of distilled water and 29.6 g di(propylene glycol) monomethyl ether ("Solution 2") was prepared. Solution 2 was poured into a 1l round bottom flask and heated with stirring to 30° C. Next Solution 1 was added drop-wise with stirring over 20 min. The mixture was stirred for another 30 min at 30° C. The reaction mixture was filtered in a filter press (40 psi) with a 0.45 micron nylon filter. The filtration took about 20 min. The solids were resuspended in 400 g of di(propylene glycol) monomethyl ether and 200 g distilled water and the mixture stirred for 3 min at 30° C. in the warring blender at setting 6. The solids were refiltered over 72 hr as above at 80 psi. The filter cake was suspended in 144 g di(propylene glycol) methyl ether and stirred for 3 min in the blender. The solids were poured into the filter press and an additional 85 g di(propylene glycol) monomethyl ether was added to the blender to rinse the solids and then everything was added to the filter press. The filtration was left at 15 psi for 4 days. The filter cake (about 105 g) was placed in an air circulating drying oven at 55–60° C. for 24 hr yielding about 18.8 g of dry catalyst. Elemental analysis indicated 10.7% Co and 21.4 wt. % Zn giving a mole ratio of Zn/Co=1.80. (Samples were prepared by using acid digestion procedures, and analyzed using a Perkin Elmer 3030B Atomic Absorption Spectrometer.) XRPD, shown in FIG. 7, indicates a mixture of U1A and cubic, with no detectable amount of $Zn_5(OH)_8Cl_2 \cdot H_2O$.

Example 6

Preparation of DMC catalyst with propylene glycol monomethyl ether as Complexing Agent A solution of 15 g (0.0452 mole) of $K_3Co(CN)_6$ in 200 ml of distilled water ("Solution 1") was prepared. A solution of 15 g (0.11 mole) $ZnCl_2$ in 250 ml of distilled water and 18 g propylene glycol monomethyl ether ("Solution 2") was prepared. Solution 2 was poured into a 1l round bottom flask and heated with stirring to 30° C. Next, Solution 1 was added drop-wise with stirring over 20 min. The mixture was stirred for another 30 min at 30° C. The reaction mixture was filtered in a filter press (40 psi) with a 0.45 micron nylon filter. The filtration took about 10 min. The solids were resuspended in 400 g of propylene glycol monomethyl ether and 200 g distilled water and the mixture stirred for 30 min at 30–35° C. in a mechanical stirrer. The solids were refiltered over 72 hr as above at 40 psi. The filter cake was suspended in 145 g di(propylene glycol) methyl ether and stirred for 2 min in the blender. The solids were poured into the filter press and an additional 50 g propylene glycol monomethyl ether was added to the blender to rinse the solids and then everything was added to the filter press. The filtration was carried out at 60 psi for 2 hr. The filter cake (about 51.6 g) was placed in an air circulating drying oven at 50° C. for 48 hr yielding about 16.8 g of dry catalyst. XRPD, shown in FIG. 9 indicates a mixture of cubic, simonkolleite and a phase having narrow peaks in positions similar to those for U1, but these peaks are too narrow to be considered a U1 phase.

Comparative Example 2

Preparation of DMC Catalyst With Primary Complexing Agent and Polyol Secondary Complexing Agent The procedure from U.S. Pat. No. 5,482,908, Example # 1 was followed except a blender rather than a homogenizer was used for mixing.

Solution 1: 8 g of $K_3CO(CN)_6$ in 140 ml distilled water.

Solution 2: 25 g $ZnCl_2$ in 40 ml distilled water.

Solution 3: 2 ml t-BuOH, 2 g of 4,000 mol wt PPG polyol (Acclaim 4200) and 200 ml distilled water.

Solution 4: mixture of 200 ml t-BuOH and 100 ml distilled water.

Solution 1 was poured into the Oster™ Blender and stirring was started in the pulse mode while solution 2 was added slowly. Then solution 4 was added and the mixture was stirred for 10 minutes in the pulse mode. Next the reaction mixture was transferred to a 600 ml beaker. The blender was rinsed with solution 3 (without the polyol) and then added to the beaker. The 2 g of 4,000 mol wt polyol was added to the beaker while stirring with a magnetic stirring bar. The stirring was continued for 3 min. The mixture was poured into the filter press with a 0.45 micron nylon filter and the filter pressurized to 60 psi. After 165 min, 480 ml of filtrate was collected. The pressure was reduced to 15 psi and the filtration left overnight. The next day, the filter cake was resuspended in 140 ml of t-BuOH and 60 ml distilled water with 2 g Acclaim™ 4200. This mixture was stirred in the blender for 10 min. under pulse mode. The mixture was filtered as above (60 psi) to completion in 2 hrs. The filter cake was once again resuspended in 200 ml t-BuOH and 1 g Acclaim™ 4200 using the blender in the pulse mode for 10 min. The filtration was carried out as above and completed in 20 min. The 10.2 g of wet catalyst was placed in an air circulating drying oven at 50° C. yielding a constant weight of catalyst of 8.8 g after 3 hr.

Comparative Example 3

Figure 4:
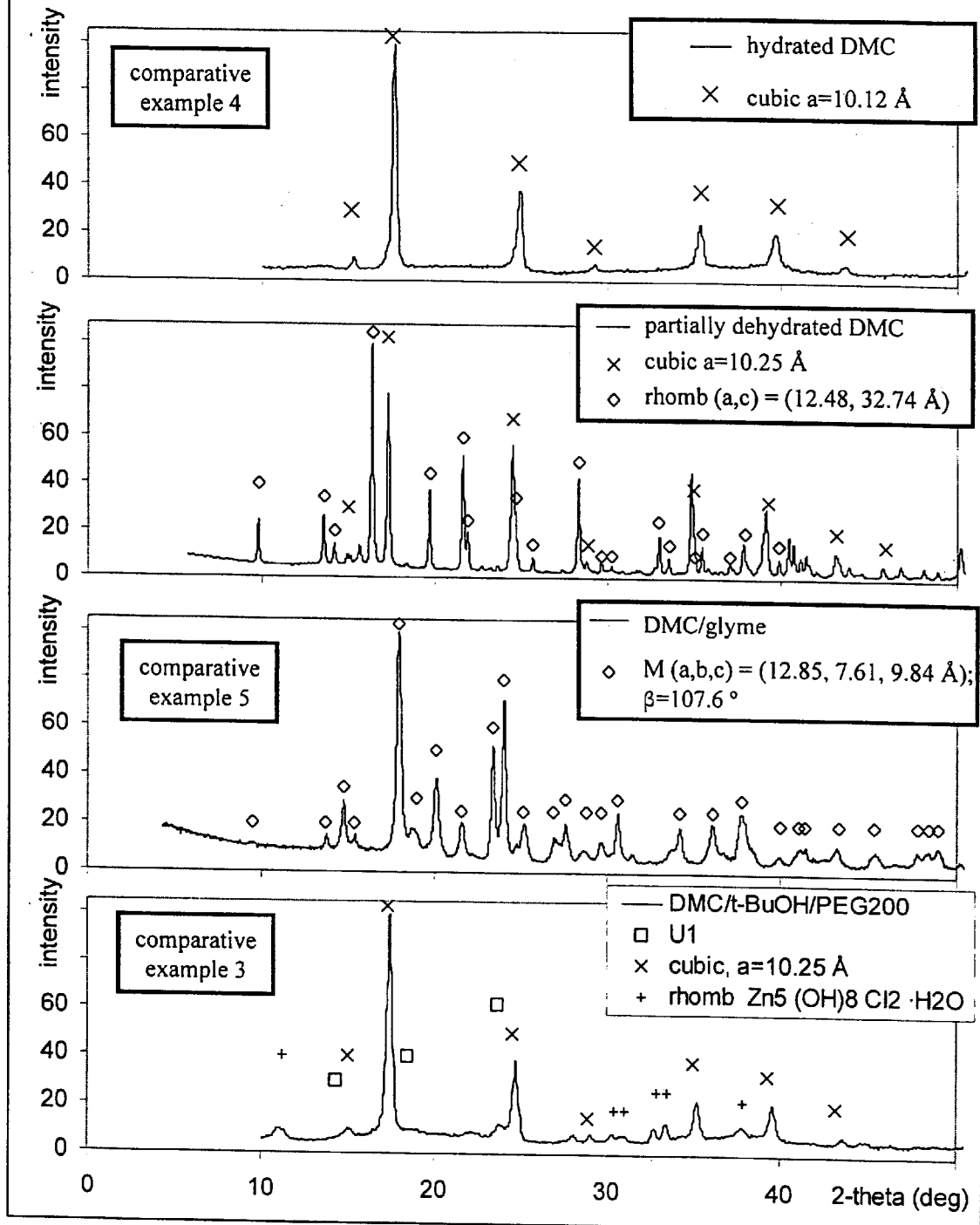

Preparation of DMC Catalyst With t-BuOH Primary Complexing Agent and Polyol Secondary Complexing Agent The procedure from WO 99/19063, Example # 3 was followed. 12.5 g (91.5 mmole) of $ZnCl_2$ dissolved in 20 ml of distilled water was added under strong stirring (about 11,000 rpm) to a solution of 4.0 g (12 mmole) of potassium hexacyanocobaltate in 70 ml water. Immediately after mixing, 50 g of t-BuOH in 50 g distilled water was added to the suspension and stirred for 10 min at 10,000 rpm. Then 1 g of poly(ethylene glycol) (mol wt about 2,000) and 100 g distilled water was added and stirring continued for another 3 min at 2,500 rpm. The solids were filtered using a filter press with 0.45 micron nylon filter at 30 psi pressure. The filtration took about 10 min. Next the solids were re-suspended in a mixture of 70 g of t-BuOH in 30 g distilled water with 1 g of poly(ethylene glycol) and the mixture stirred for 10 mm at 10,000 rpm. At that time some solids remained unsuspended and the solution was transferred to a blender and mixed in the pulse mode for 2 min. This mixture was filtered as above in a few min. Once again the solids were re-suspended in 100 g of t-BuOH and 0.5 g poly (ethylene glycol) and stirred in the blender under the pulse mode for 2 min. The filter cake was filtered as above. The wet catalyst was placed in an air circulating oven at 50° C. and dried to constant weight of about 4.2 g. XRPD, shown in FIG. 4, indicates a mixture of cubic, $Zn_5(OH)_8Cl_2.H_2O$, and U1A.

Comparative Example 4

Preparation of DMC Catalyst With No Primary Complexing Agent

Solution 1 was prepared containing 15 g of zinc chloride in 200 ml of distilled water. Solution 2 was prepared containing 15 g of potassium hexacyanocoboltate in 250 ml of distilled water. Solution 1 was added to Solution 2 in a round bottom flask with stirring over a 2 minute period. The mixture was stirred for an additional 15 minutes at 35° C. The suspension was poured into the filter press, the flask washed with an additional 50 ml water and the mixture filtered through a 0.45 micron nylon filter with 40 psi back pressure. The filter cake was resuspended in 200 ml distilled water and stirred in the round bottom flask for 20 minutes. The suspension was refiltered as above and the filter cake dried to constant weight in an air circulating drying oven at 50° C. XRPD, shown in FIG. 4 indicates a pure cubic phase (no detectable amounts of other phases such as $Zn_5(OH)_8Cl_2.H_2O$, U1, U1A, or rhombohedral dehydrated DMC).

Comparative Example 5

Preparation of DMC Catalyst With Glyme as Complexing Agent

The procedure from U.S. Pat. No. 4,477,589 was followed. 8.8 g of potassium hexacyanocobaltate was dissolved in 170 ml distilled water, 7.7 g of zinc chloride was dissolved in 80 ml distilled water and 1.0 g of flake NaOH was dissolved in 75 ml distilled water. The zinc chloride solution was poured into a 7 speed blender. The blender was turned to the highest speed and the potassium hexacyanocoboltate solution was poured in over a 2 minute time interval. The mixture was blended for 2 minutes and then the NaOH solution was added over 1 minute. The mixture was blended for 5 minutes and was then placed in an oven at 65° C. for 1 hour. The mixture was then quickly vacuum filtered and the filter cake was resuspended in 200 ml distilled water in the blender at highest speed over 5 minutes. This mixture was vacuum filtered and again the filter cake was resuspended in 200 ml of distilled water and stirred in the blender for 5 minutes before vacuum filtration. The filter cake was sucked as dry as possible and then the filter cake was suspended in 120 g of ethylene glycol dimethyl ether (glyme) using the blender. After blending for 5 minutes, 4.5 ml of concentrated HCl, 4 ml water and 25 ml glyme were added to the suspension and blending was continued for 2 minutes. The mixture was left to stand overnight and the supernatant liquid was removed and the wet solid was dried in a rotary evaporator. XRPD, shown in FIG. 4, indicates monoclinic DMC catalyst, with no detectable amounts of U1, U1A, cubic, or $Zn_5(OH)_8Cl_2.H_2O$. Computational indexing gave monoclinic cell parameters (a, b,c)=(12.85, 7.61, 9.84 A); β=107.6°.

Examples 7–24

Catalyst Activity Determinations

Each of the catalysts prepared above were used to polymerize propylene oxide ("PO") using 2,4-diethyl-1,5-pentanediol as starter. The feed charge was comprised of 16 g (0.1 mole) 2,4-diethyl-1,5-pentanediol, 29 g (0.5 mole) freshly distilled propylene oxide and 10 DMC catalyst. Test runs were conducted twice with each of the catalysts. The first run was conducted with 0.042 (100 ppm) of DMC catalyst; the second with 0.021 (50 ppm) of DMC catalyst. (The ppm of the catalyst is based on a final molecular weight of 4,000.) The ratio of PO/starter in the charge was 5 for all the experiments in Table 1. Feed charge was introduced into a 300 ml Parr™ pressure reactor at room temperature. The reactor was 15 flushed three times with nitrogen at 30 psi and the reactor was then heated to 125° C. The time to reach 100° C. was used as $T_{start}$ and the time for $T_{start}$ to the initial exotherm was recorded. The time from $T_{start}$ to the point when all of the PO was consumed was also recorded. Manual cooling was applied to try to maintain the temperature at about 125° C.

This was not always possible because of the relatively high PO/starter ratio. In a few cases 20 as noted in Table 1, the exotherm was not controlled by the cooling. (In order to better control the reaction, all the remaining activity determinations of the invention were run at a PO/starter ratio of 3—See Table 5). The activity is summarized in Table 1.

controlled, and whether an uncontrolled reaction leads to premature catalyst deactivation. For example, compare Examples 19–20. Using 50 ppm of catalyst, times for the initial exotherm ranged from 1.5 to 26 minutes. The catalysts of the invention tended to give faster initial exotherms than the catalysts of the Comparative Examples. The reaction completion times ranged from 19 to 98 minutes. The catalysts from Comparative Examples 1 and 2 exhibited a greater induction period (slower time to exotherm) but both catalysts went to completion in times comparable to the catalysts of the invention. Several of the catalysts of the invention were comparable in activity to the catalysts of U.S. Pat. No. 5,482,908.

At 50 ppm catalyst, all of the examples listed in Table 1 exhibited good activity except for Example 16 and Comparative Example 20. The rating of good verses poor is somewhat uncertain but it is based on the following:

| poor | 9 ≦ exotherm | 70 ≦ completion |
| good | 2 ≦ exotherm ≦ 26 | 19 ≦ completion ≦ 50 |

These ranges cover all cases except for Example 20, which had a high exotherm at two minutes (not controlled), and completed at 69 minutes. Based on the rapid exotherm, and based on performance at 100 ppm (Ex. 19), Example 20 is considered to have good activity.

Table 1 shows that good catalyst activity at 50 ppm catalyst level can be obtained for catalysts having different ligands and different crystal structures. Examples 9 (MTPG)

TABLE 1

| Ex. No. | Catalyst # | Complexing Agent | Other Modifier | Cat level* ppm | Activity at 50 ppm | Time to Exotherm (min) | Time to Completion (min) | Reaction Exotherm Not Controlled |
|---|---|---|---|---|---|---|---|---|
| (Comp.) 7 | Comp. Ex. 1 | t-BuOH | None | 100 | | 13 | 26 | |
| (Comp.) 8 | Comp. Ex. 1 | t-BuOH | None | 50 | Good | 21 | 38 | |
| 9 | Ex. 3 | MTPG | None | 55 | Good | 1.5 | 28.5 | x |
| 10 | Ex. 3 | MTPG | None | 25 | | 6 | 148 | |
| 11 | Ex. 4 | MTEG | None | 100 | | 20 | 65.5 | |
| 12 | Ex. 4 | MTEG | None | 50 | Good | 26 | 46 | |
| 13 | Ex. 5 | MPG | None | 100 | | 2 | 4 | |
| 14 | Ex. 5 | MPG | None | 50 | Good | 3 | 20 | |
| 15 | Ex. 6 | MPG | None | 100 | | 3 | 22 | |
| 16 | Ex. 6 | MPG | None | 50 | Poor | 9 | 98 | |
| 17 | Ex. 1 | MTPG | None | 100 | | 2 | 11 | |
| 18 | Ex. 1 | MTPG | None | 50 | Good | 4.5 | 24 | |
| 19 | Ex. 2 | MDPG | None | 100 | | 1 | 2 | x |
| 20 | Ex. 2 | MDPG | None | 50 | Good | 1.55 | 68.5 | x |
| (Comp.) 21 | Comp. Ex. 3 | t-BuOH | PEG 2000 | 100 | | 5 | 17 | |
| (Comp.) 22 | Comp. Ex. 3 | t-BuOH | PEG 2000 | 50 | Poor | 12 | 71 | |
| (Comp.) 23 | Comp. Ex. 2 | t-BuOH | PPG 4200 | 100 | | 8 | 11 | x |
| (Comp.) 24 | Comp. Ex. 2 | t-BuOH | PPG 4200 | 50 | Good | 13 | 19 | x |

*based on a 4,000 Mol Wt Diol

The time to initial exotherm is one measure to establish differences in activity between the different catalysts. When the reactor is cooled manually, the time to the initial exotherm is a better measure of catalyst activity differences than the reaction completion time since the time to completion will vary with how uniformly the reaction exotherm is and 12 (MTEG) gave good activity with a catalyst that contains no detectable cubic, U1, or U1A crystal phases. Example 14 (MDPG) gave good activity with a catalyst that contains only cubic and U1A (no other phases present). Example 18 (MTPG) gave good activity with a catalyst that contains only cubic, U1A, plus $Zn_5(OH)_8Cl_2 \cdot H_2O$.

Further experiments were conducted in order to determine the unsaturation level of some of the higher molecular weight polyols produced from the inventive catalysts. The results are tabulated in Table 2.

TABLE 2

| Catalyst | Complexing Agent | Starter | Unsat (meq/g) | OH# | Mol Wt |
|---|---|---|---|---|---|
| Ex. 2 | MDPG | DEPD | 0.012 | 64.7 | 1,734 |
| Comp. Ex. 2 | t-BuOH/PPG | Accl 2200 | 0.0053 | 18.7 | 6,000 |
| Ex. 2 | MDPG | Accl 2200 | 0.0104 | 21.9 | 5,123 |
| Ex. 1 | MTPG | Accl 2200 | 0.0124 | 23.4 | 4,794 |
| Ex. 5 | MDPG | Accl 2200 | 0.0162 | 24.4 | 4,598 |

For each of the runs in Table 2, a 300 ml Parr reactor was charged with about 41 g (0.02 mole) of Acclaim® 2200 (a 2000 molecular weight all propylene oxide derived polyol produced from DMC catalysts by Bayer) and 0.0061 g of the noted DMC catalysts (~50 ppm based on a 4000 molecular weight diol). The reactor was pressure checked with nitrogen at 30 psi and the evacuated. The reactor was heated to 115° C. and vacuum was applied for 1 minute to remove water. At this time propylene oxide addition was started in increments, keeping the overall reactor pressure below 5 psi for the most part. The PO additions were carried out over 3 to 5 hours and the temperature was maintained at 115 or 120° C. Samples were submitted to an outside lab for hydroxyl number and unsaturation. The molecular weight was calculated from the hydroxyl number based on a pure diol.

Outside of the test run using the catalyst of Comp. Ex. 2, the unsaturation values for each of the catalysts were slightly above 0.01 meq/g. The unsaturation from the catalyst preparations of the invention ranged from 0.0104 meq/g to 0.0162 meq/g. It is anticipated that an optimixed procedure for preparing these catalysts will render polyols with lower unsaturation.

Examples 25–31

DMC Catalyst Preparation Study

Examples 25–31 explore the influence of mixing on the properties and performance of the catalysts. The Premier Dispersator described earlier was used for the less intensive mixing. An Osterizer Classic Blender was used for the more intensive mixing experiments. The blender is capable of achieving about 17–18,000 rpm with a high shear propeller type agitator. When the high speed mixer was used, there was only a slight increase in temperature for the catalyst preparation (about 5° C. in 13 min) while the blender caused the temperature to rise about 6–7° C. every 2 minutes of mixing. The temperature begins to level off at longer mixing times. The high speed mixer produces noticeably less shear than the blender.

Using the same process as set forth in Example 1 as a starting point, the following set of experiments were run:

Example 25

Ex. 1 was repeated to determine reproducibility. The temperatures of the reactants of Example 25 were maintained for Examples 26–31.

Example 26

Ex. 1 was repeated using the mixer in the first step, but replacing the mixer with the blender in the two successive washing steps. The blender conditions recited in Ex. 2 was followed.

Example 27

Ex. 1 was repeated using the blender for all steps. (The blender time for step 1 was the same as the mixer time in the original procedure.)

Example 28

Ex. 27 was repeated except the pulse mode was not used and the mixing time for steps 2 and 3 was increased two-fold. The results correspond to the formula $Zn_{2.4}Cl_{1.0}(OH)_{0.8}Co(CN)_6 \cdot 1.95MTPG \cdot 1.0H_2O$, the analytical data (elemental analysis) being as follows (calculated values in brackets):

| | | |
|---|---|---|
| K | 0.22 | (0.0) |
| Zn | 18.2 | (18.7) |
| Co | 6.9 | (7.0) |
| Cl | 4.2 | (4.2) |
| N | 10.0 | (10.0) |
| C | 36.0 | (36.4) |
| H | 5.3 | (5.5) |
| O | 19.2 | (18.3) |

Example 29

Ex. 26 was repeated except the concentration of Co was doubled.

Example 30

Ex. 27 was repeated except the concentration of Co was doubled.

Example 31

Ex. 28 was repeated except the order of addition of Zn to Co was reversed, i.e., Co was added to Zn.

Other data obtained is set forth in Table 3. For comparison purposes, the data from the previous runs is included also in Table 3.

TABLE 3

| Catalyst Ex. No. | Complex ing Agent(s) | Type Stirring(1) | | | Filtration Time/min | | | Yield, g |
|---|---|---|---|---|---|---|---|---|
| | | Step 1 | Step 2 | Step 3 | Step 1 | Step 2 | Step 3 | |
| Comp. Ex. 1 | t-BuOH | G | G | G | 85 | ON | 205 | 13.7 |
| Ex. 3 | MTPG | G | G | BP2 | 100 | 2 day | 240 | 17.2 |
| Ex. 4 | MTEG | G | BP2 | BP2 | 15 | 2+ day | ON | 27.6 |
| Ex. 5 | MDPG | G | BP2 | BP2 | 20 | 2+ day | ON | 18.8 |

TABLE 3-continued

| Catalyst Ex. No. | Complex ing Agent(s) | Type Stirring(1) | | | Filtration Time/min | | | Yield, g |
|---|---|---|---|---|---|---|---|---|
| | | Step 1 | Step 2 | Step 3 | Step 1 | Step 2 | Step 3 | |
| Ex. 1 | MTPG | D | D | D | 5 | 28 | 50 | 6.8 |
| Comp. Ex. 3 | t-BuOH/PEG2000 | D | BP2 | BP2 | 10 | 10 | 10+ | 4.2 |
| Ex. 6 | MPG | G | G | BP2 | 10 | ON | 100 | 16.8 |
| Ex. 2 | MDPG | D | BP2 | BP2 | 10 | 90 | 20 | 5.4 |
| Comp. Ex. 2 | t-BuOH/PPG4000 | B10 + 3 | BP2 | BP2 | ON | 120 | 20 | 8.8 |
| Ex. 25 | MTPG | D | D | D | 3.5 | 25 | 25 | 6.6 |
| Ex. 26 | MTPG | D | BP2 | BP2 | 3 | 70 | 40 | 6.6 |
| Ex. 27 | MTPG | B10 + 3 | BP2 | BP2 | 12 | 50 | 65 | 5.8 |
| Ex. 28 | MTPG | B10 + 3 | B4 | B4 | 25 | 120 | 88 | 5.2 |
| Ex. 29 | MTPG | D | BP2 | BP2 | 5 | 60 | 105 | 15.8 |
| Ex. 30 | MTPG | B10 + 3 | BP2 | BP2 | 24 | 110 | 540 | 16.1 |
| Ex. 31 | MTPG | D | BP2 | BP2 | 16 | 190 | ON+ | 24.8 |

G = gentle stirring
D = high speed stirring (dispersator)
BP2 = blender (Oster ™) pulse mode for 2 min.
B10 + 3 = blender full mode for 10 min + 3 min.
B4 = blender full mode for 4 min.
O.N. = overnight The catalyst yield for Exs. 25–28 were similar—about 5–6 gm. (Some mechanical losses occurred every time the blender was used.) Examples 29–31, wherein the amount of Co was doubled, exhibited a greater catalyst yield. The filtration time further increased when the blender was used in the catalyst washing steps. Notably, longer blender times lead to longer filtration times.

XRPD for these DMC/MTPG catalysts (Examples 1 and 25–28, shown in FIG. 5), indicate a mixture of crystalline phases, including U1A, cubic, and $Zn_5(OH)_8Cl_2.H_2O$. The relative amount of the U1A phase, as determined by the height of the sharp peak at 23.6 degrees 2-theta, follows the trend Ex 28>Ex 27>Ex 26, Ex 25>Ex 1. As U1A content decreases, the features between 14 and 22 degrees 2-theta appear to transform into a broad, smooth, amorphous hump centered at about 20 degrees 2-theta. However this very broad feature is unlikely to be associated with an amorphous DMC catalyst phase, because it is associated with the sharp peak at 23.6 degrees 2-theta. Exs. 26, 1, and 25 appear to be 25 wt % cubic or greater. FIG. 5 also shows XRPD for the DMC/MTPG catalyst of Example 3. As determined by XRPD, the catalyst of Example 3 contains none of the crystal phases contained in Examples 25–28. Elemental analyses of Ex. 3 and Ex. 28 are similar except that Ex. 28 contains roughly 50% more MTPG (ligand) content (by mole). The structural difference between the two catalysts is believed to result from differences in the catalyst preparation and not directly from differences in ligand content.

Examples 32–44

Preparation of DMC Catalyst with other Complexing Agents

Examples 32–44 explore the use of other complexing agents in the preparation of other DMC catalysts. These catalysts were prepared by the procedures set forth from the mixing study, specifically the procedure used for the catalyst of Examples 26 and 28. Complexing agents studied were the methyl ether of propylene glycol ("MPG") and triethylene glycol ("MTEG"), Arcosolve™ PNP (1-propoxy-2-propanol) ("PPG"), Arcosolve™ PTB (1-t-butoxy-2-propanol) ("t-BPG"), Butyl Cellosolve™ (monobutylether of ethylene glycol) ("BEG"), Propyl Cellosolve™ (monopropylether of ethylene glycol) ("PEG"), Dowanol™ DM (monomethylether of diethylene glycol) ("MDEG"), 1-t-butoxy-2-ethanol (t-BEG) and Butyl Carbitol™ (monobutylether of diethylene glycol) ("BDEG"). In Example 38, a mixture of complexing agents (MPG and MTPG) were used. The catalyst was prepared by the procedure of Comparative Example 3. The resulting data is tabulated in Table 4 below.

TABLE 4

| Cata-lyst Ex. No. | Complex-ing Agent(s) | Type Stirring(1) | | | Filtration Time/min | | | Yield, g | Prepared by Process set forth in Ex. |
|---|---|---|---|---|---|---|---|---|---|
| Ex. 32 | MTEG | D | BP2 | BP2 | 5 | 85 | 210 | 6.1 | 26 |
| Ex. 33 | BDEG | D | BP2 | BP2 | 45 | ON+ | 75 | 5.1 | 26 |
| Ex. 34 | t-BPG | D | BP2 | BP2 | 10 | 18 | 7 | 3.8 | 26 |
| Ex. 35 | MPG | D | BP2 | BP2 | 11 | 100 | 60 | 4.9 | 26 |
| Ex. 36 | BEG | D | BP2 | BP2 | 15 | 60 | 32 | 5.6 | 26 |
| Ex. 37 | PEG | D | BP2 | BP2 | 25 | 30 | 15 | 5.4 | 26 |
| Ex. 38 | MPG/MTPG | D | BP2 | BP2 | 15 | 100 | 75 | 5.6 | Comp. Ex. 3 |
| Ex. 39 | PPG | D | BP2 | BP2 | 15 | 15 | 15 | 4.1 | 26 |
| Ex. 40 | MPG | B10 + 3 | B4 | B4 | 65 | ON+ | 60 | 3.4 | 28 |
| Ex. 41 | BEG | B10 + 3 | B4 | B4 | 140 | 20 | 30 | 5.8 | 28 |

TABLE 4-continued

| Cata-lyst Ex. No. | Complex-ing Agent(s) | Type | Stirring(1) | | Filtration Time/min | | Yield, g | Prepared by Process set forth in Ex. |
|---|---|---|---|---|---|---|---|---|
| Ex. 42 | MDPG | B10 + 3 | B4 | B4 | 23 | 175 | 45 | 4.3 | 28 |
| Ex. 43 | MDEG | B10 + 3 | B4 | B4 | 20 | 120 | 45 | 4.1 | 28 |
| Ex. 44 | t-BEG | B10 + 3 | B4 | B4 | 80 | 60 | 30 | 4.9 | 28 |

G = gentle stirring
D = high speed stirring (dispersator)
BP2 = blender (Oster ™) pulse mode for 2 min
B 10 + 3 = blender full mode for 10 min + 3 min
B4 = blender full mode for 4 min.
O.N. = overnight In addition, elemental analysis was conducted on the catalyst of Examples 36, 40, 42, and 43. The results for Example 36 correspond to the formula $Zn_{2.5}Cl_{1.15}(OH)_{0.85}Co(CN)_6 \cdot 1.8BEG \cdot 1.1H_2O$, the analytical data (elemental analysis) being as follows (calculated values in brackets):

| K | 0.14 | (0.0) |
|---|---|---|
| Zn | 24.5 | (24.5) |
| Co | 8.8 | (8.8) |
| Cl | 6.1 | (6.1) |
| N | 12.6 | (12.6) |
| C | 30.2 | (30.3) |
| H | 4.2 | (4.3) |
| O | 13.5 | (13.3) |

The results for Example 40 correspond to the formula $Zn_{2.18}Cl_{0.48}(OH)_{0.88}Co(CN)_6 \cdot 1.2$ MPG$\cdot 0.5H_2O$, the analytical data (elemental analysis) being as follows (calculated values in brackets):

| K | 0.12 | (0.0) |
|---|---|---|
| Zn | 27.4 | (28.1) |
| Co | 11.4 | (11.6) |
| Cl | 3.3 | (3.4) |
| N | 17.0 | (16.6) |
| C | 25.5 | (25.6) |
| H | 2.6 | (2.8) |
| O | 12.6 | (11.9) |

The results for Example 42 correspond to the formula $Zn_{2.4}Cl_{1.2}(OH)_{0.6}Co(CN)_6 \cdot 1.6$ MDPG$\cdot 1.1H_2O$, the analytical data (elemental analysis) being as follows (calculated values in brackets):

| K | 0.16 | (0.0) |
|---|---|---|
| Zn | 22.4 | (23.0) |
| Co | 8.5 | (8.6) |
| Cl | 6.0 | (6.2) |
| N | 12.7 | (12.3) |
| C | 30.5 | (30.3) |
| H | 4.1 | (4.2) |
| O | 15.6 | (15.3) |

The results for Example 43 correspond to the formula $Zn_{2.4}Cl_{1.0}(OH)_{0.8}Co(CN)_6 \cdot 1.4$ MDEG$\cdot 0.7H_2O$, the analytical data (elemental analysis) being as follows (calculated values in brackets):

| K | 0.16 | (0.0) |
|---|---|---|
| Zn | 25.6 | (26.1) |
| Co | 9.6 | (9.8) |
| Cl | 6.0 | (5.9) |
| N | 14.0 | (14.0) |
| C | 25.8 | (25.9) |
| H | 3.1 | (3.2) |
| O | 15.7 | (15.2) |

XRPD was carried out for the catalysts of Examples 32, 35, 36, 38, 40, 42, and 43.

The DMC/MTEG catalyst of Ex. 32 (FIG. 6) contains a mixture of crystalline phases, including U1 and $Zn_5(OH)_8Cl_2 \cdot H_2O$. This catalyst does not appear to contain any cubic DMC.

The DMC/MDPG catalyst of Ex. 42 (FIG. 7) contains a crystal phase similar to U1 (but not U1A), $Zn_5(OH)_8Cl_2 \cdot H_2O$, and a tiny amount of cubic (less than 1 wt. %). The XRPD for this catalyst differs substantially from that for the other DMC/MDPG catalysts shown in FIG. 7.

The DMC/MDEG catalyst of Ex. 43 (FIG. 8) contains U1 plus a small amount of $Zn_5(OH)_8Cl_2 \cdot H_2O$.

The DMC/MPG and DMC/MPG/MTPG catalysts of Ex. 35 and 38 (FIG. 9), respectively, are poorly resolved. These catalysts contain $Zn_5(OH)_8Cl_2 \cdot H_2O$, and they also appear to contain cubic, and U1A. The DMC/MPG catalyst of Ex. 40 (FIG. 9) contains U1 and no detectable cubic or $Zn_5(OH)_8Cl_2 \cdot H_2O$.

The DMC/BEG catalyst of Ex. 36 (FIG. 10) contains U1 and no detectable cubic or $Zn_5(OH)_8Cl_2 \cdot H_2O$.

Examples 45–76

Catalyst Activity Determinations

The catalyst prepared in the mixing study (Examples 25–31) and the catalysts from other complexing agents (Examples 32–44) were screened for activity. For each of Examples 45–76, a 300 ml Parr™ pressure reactor was charged with 24 g (0.15 mole) 2,4-diethyl-1,5-pentanediol, 27 g (0.45 mole) freshly distilled propylene oxide and 0.031 g (50 ppm based on 2,000 eq. wt.) of the DMC catalyst. Thus, the PO/Starter ratio was 3.0 for all the example of Tables of Table 5. The reactor was flushed three times with nitrogen at 30 psi. The reactor was then heated to 120° C. The time to reach 100° C. was used as $T_{start}$ and the time from $T_{start}$ to the initial exotherm was recorded. Manual cooling was applied to try to maintain the temperature at about 120° C. This was achievable in most cases. The time from $T_{start}$ to the point when all the PO was consumed was recorded unless the reaction was so slow that only the rate of PO consumption was noted as a change in the reactor pressure. Unlike the data generated in Table 1, better control of the exotherm allows one to use the time to completion to differentiate the differences in catalytic activity. Catalyst activity is set forth in Table 5.

PO/starter ratio of 3 to compare its activity to other catalysts prepared from the other complexing agents. Example 76 in Table 5 shows that this catalyst is classified as high activity.

Table 5 shows the activities (Ex. Nos. 45–51) of the catalysts from the mixing study (Ex. Nos. 25–31) all using the same complexing agent (MTPG). The full blender mode of Example 28 gave the highest activity (Examples 50–51).

TABLE 5

| Ex. No. | Cat from Ex. No. | Catalyst Prepared by Process of Ex. No. | Complexing Agent | Activity at 50 PPM | Time to exotherm min | Time to completion min |
|---|---|---|---|---|---|---|
| 45 | 25 | 25 | MTPG | Med | 6 | 35 |
| 46 | 25 | 25 | MTPG | Med | 6 | 37 |
| 47 | 26 | 26 | MTPG | Low | 7 | 47 |
| 48 | 27 | 27 | MTPG | Med | 5 | 22 |
| 49 | 27 | 27 | MTPG | Med | 5 | 26 |
| 50 | 28 | 28 | MTPG | High | 3 | 7 |
| 51 | 28 | 28 | MTPG | High | 2 | 9 |
| 52 | 29 | 29 | MTPG | Low | 30 | ΔP = 6 psi/hr |
| 53 | 30 | 30 | MTPG | Low | 8 | ΔP = 12 psi/hr |
| 54 | 31 | 31 | MTPG | Low |  | ΔP = 3 psi/hr |
| 55 | 28* | 28 | MTPG |  | 6 | 43 |
| 56 | 32 | 26 | MTEG | Med | 9 | 33 |
| 57 | 33 | 26 | BDEG | Low | 10 | 49 |
| 58 | 34 | 26 | tBPG | Low | 10 | ΔP = 19 psi/hr |
| 59 | 35 | 26 | MPG | High | 3 | 13 |
| 60 | 36 | 26 | BEG | High | 3 | 10 |
| 61 | 37 | 26 | PEG | Low | 7 | ΔP = 17 psi/hr |
| 62 | 38 | 26 | MPG/MTPG | Med | 4 | 23 |
| 63 | 39 | 26 | PPG | Low | 12 | ΔP = 18 psi/hr |
| 64 | 40 | 28 | MPG | High | 4 | 8 |
| 65 | 40* | 28 | MPG |  | 6 | 13 |
| 66 | 41 | 28 | BEG | High | 2 | 6 |
| 67 | 41* | 28 | BEG |  | 5 | 26 |
| 68 | 42 | 28 | MDPG | High | 1 | 4 |
| 69 | 42* | 28 | MDPG |  | 2 | 14 |
| 70 | 43 | 28 | MDEG | High | 3 | 8 |
| 71 | 43* | 28 | MDEG |  | 6 | 18 |
| 72 | 44 | 28 | t-BEG | High | 2 | 4.5 |
| 73 | 44* | 28 | t-BEG |  | 5 | 21 |
| 74 | Comp. Ex. 5 | Comp. Ex. 5 | Glyme | High | 2 | 6 |
| 75 | Comp. Ex. 5* | Comp. Ex. 5 | Glyme |  | 6 | 47 |
| 76 | 3** | Comp. Ex. 1 | MTPG | High | 2.5 | 17.5 |

*= 25 ppm catalyst verses 50 ppm for all other runs
**= Catalyst from example 3, run here with a PO/Starter ratio = 3 rather than 5 used in Table 1

Using 50 ppm of catalyst (50 ppm DMC based on 2,000 eq wt), reaction completion times ranging from 4 to 49 minutes except for examples 52, 53, 54, 58, 61, and 63 which were so slow that the reaction was terminated before completion.

At the 50 ppm catalyst level, catalyst activity can be characterized as low, medium, or high according to time required for exotherms and completion (in minutes), as follows.

| low | 7 ≤ exotherm | 40 ≤ completion |
|---|---|---|
| medium | 4 ≤ exotherm ≤ 7 | 20 ≤ completion ≤ 40 |
| high | exotherm ≤ 4 | completion ≤ 20 |

These ranges cover all catalysts except for Example 56, where the activity is low relative to exotherm, but medium relative to completion. Based on completion time, Example 56 is classified as medium.

The catalyst of Example 3 evaluated earlier (Table 1—Example 9) shows comparable activity to the catalysts of Comparative Examples 1,2 and 3 (Table 1—Examples 8, 22 and 24). The catalyst of Example 3 was rerun here at the PO/starter ratio of 3 to compare its activity to other catalysts prepared from the other complexing agents. Example 76 in Table 5 shows that this catalyst is classified as high activity.

Ex. Nos. 52, 53 and 54 from this same mixing study (all having a doubled cobalt content) all gave very low activity.

Table 5 also shows activity data for catalysts made using the other complexing agents as well as a re-evaluation of one catalyst previously run in Table 1. These catalysts were prepared by the procedures set forth in either Example 26 or 28. Five catalysts were made by the process of example 28, and in each case the catalytic activity was high. Eight catalysts were made by the process of example 26, and two of these had high activity (Examples 59 and 60). For this process, the DMC/MPG catalyst gave high activity, the DMC/MTPG catalyst gave low activity, and the DMC/MPG/MTPG catalyst (with the mixed complexing agents) gave medium activity. Overall, the process of example 28 appears to be more reliable than that of example 26 in producing catalysts with high activity. Seven catalysts with high activity at 50 ppm were also run at 25 ppm (Examples 55, 65, 67, 69, 71, 73 and 75). Except for Examples 55 and 75, the completion times were still very fast at 25 ppm (26 minutes or less).

High catalyst activity was observed for catalysts having a variety of crystal structures. Examples 74 (glyme) and 76 (MTPG), gave high activity with crystalline monoclinic catalysts that contain no detectable cubic, U1, U1A, or $Zn_5(OH)_8Cl_2 \cdot H_2O$ crystal phases. Examples 60 (BEG) and 64 (MPG) gave high activity with catalysts that contain U1 but no detectable cubic or $Zn_5(OH)_8Cl_2 \cdot H_2O$. Examples 68 (MDPG) and 70 (MDEG) gave high activity with a catalyst that contains U1 and $Zn_5(OH)_8Cl_2 \cdot H_2O$, but no cubic. Examples 45–51 (MTPG) all contain mixtures of U1A, cubic, and $Zn_5(OH)_8Cl_2 \cdot H_2O$; catalytic activities ranged from low to high.

These examples illustrate the practice of the present invention in its preferred embodiments. The examples are provided to illustrate the invention and not to limit it. Other embodiments within the scope of the claims herein will be apparent to one skilled in the art from consideration of the specification and practice of the invention as disclosed herein. As an example, catalyst activity might be improved by optimizing parameters such as ligand content, drying, Zn/Co mole fraction, and potassium content. It is intended that the specification, together with the examples, be considered exemplary only, with the scope and spirit of the invention being indicated by the claims that follow.

We claim:

1. A double metal cyanide ("DMC") catalyst consisting of a double metal cyanide compound and, as complexing agent, at least one compound of the formula:

$$R_1O(CH_2CHR_2O)xH \qquad (I)$$

wherein:
x is 1, 2, or 3;
$R_1$ is a $C_1$–$C_4$ alkyl group; and
$R_2$ is —H or a —$CH_3$ group
provided that $R_1$ is not t-butyl.

2. The catalyst of claim 1, wherein $R_1$ and each $R_2$ are —$CH_3$ and x is 3.

3. The catalyst of claim 1, which contains neither cubic, U1 nor U1A crystalline phases.

4. The catalyst of claim 1, which contains cubic, U1 or U1A crystalline phases.

5. The catalyst of claim 2, which exhibits the x-ray diffraction pattern of Example 3.

6. The catalyst of claim 1, wherein the DMC compound is zinc hexacyanocobaltate and the metal salt is a zinc halide.

7. The catalyst of claim 1, wherein the double metal cyanide compound is the reaction product of a metal salt and a metal cyanide which contains greater than about 0.2 moles of the metal salt per mole of metal cyanide.

8. The catalyst of claim 2, wherein the catalyst is monoclinic.

9. The catalyst of claim 1, wherein $R_1$ is —$CH_3$, each $R_2$ is —H, and x is 3.

10. The catalyst of claim 9, wherein the catalyst contains neither cubic, U1 nor U1A crystalline phases.

11. The catalyst of claim 9, wherein the catalyst contains cubic, U1 or U1A crystalline phases.

12. The catalyst of claim 1, wherein $R_1$ is —$CH_3$, $R_2$ is —$CH_3$ and x is 1.

13. The catalyst of claim 12, wherein the catalyst contains neither cubic, U1 nor U1A crystalline phases.

14. The catalyst of claim 12, wherein the catalyst contains cubic, U1 or U1A crystalline phases.

15. The catalyst of claim 1, wherein $R_1$ is —$CH_3$, $R_2$ is —H, and x is 2.

16. The catalyst of claim 15, wherein the catalyst contains neither cubic, U1 nor U1A crystalline phases.

17. The catalyst of claim 15, wherein the catalyst contains cubic, U1 or U1A crystalline phases.

18. The catalyst of claim 1, wherein $R_1$ is —$CH_3$, $R_2$ is —$CH_3$, and x is 2.

19. The catalyst of claim 18, wherein the catalyst contains neither cubic, U1 nor U1A crystalline phases.

20. The catalyst of claim 18, wherein the catalyst contains cubic, U1 or U1A crystalline phases.

21. The catalyst of claim 1, wherein $R_2$ is —H and x is 1.

22. The catalyst of claim 21, wherein the catalyst contains neither cubic, U1 nor U1A crystalline phases.

23. The catalyst of claim 21, wherein the catalyst contains cubic, U1 or U1A crystalline phases.

24. A double metal cyanide (DMC) catalyst which contains a complexing agent as set forth in claim 1 and which exhibits the x-ray diffraction pattern of any of the XRPDs of FIGS. 5–10.

25. A double metal cyanide ("DMC") catalyst consisting of the reaction product of a metal salt and a metal cyanide salt in the presence of a complexing agent, wherein the complexing agent consists of at least one compound of the formula:

$$R_1O(CH_2CHR_2O)_xH \qquad (I)$$

wherein:
x is 1, 2, or 3;
$R_1$ is a $C_1$–$C_4$ alkyl group; and
$R_2$ is —H or a —$CH_3$ group
provided that $R_1$ is not t-butyl.

26. A method of making a highly active DMC complex catalyst, consisting of reacting an aqueous solution of a metal salt and a metal cyanide salt and reacting the resulting product with an organic complexing agent, wherein the complexing agent consists of at least one compound of the formula:

$$R_1O(CH_2CHR_2O)_xH \qquad (I)$$

wherein:
x is 1, 2, or 3;
$R_1$ is a $C_1$–$C_4$ alkyl group; and
$R_2$ is —H or a —$CH_3$ group
provided that $R_1$ is not t-butyl.

27. The method of claim 26, wherein the reaction product of metal salt and metal cyanide salt is zinc hexacyanocobaltate.

28. The method of claim 26, further consisting of washing the precipitate with a mixture of water and organic complexing agent.

29. A method of making a double metal cyanide ("DMC") catalyst consisting of:

(a) combining and reacting an aqueous solution of a water-soluble metal salt and a water-soluble metal cyanide salt in the presence of a complexing agent to produce an aqueous mixture containing a precipitated DMC complex catalyst, wherein the complexing agent consists of the formula:

$$R_1O(CH_2CHR_2O)_xH \qquad (I)$$

wherein:
x is 1, 2, or 3;
$R_1$ is a $C_1$–$C_4$ alkyl group; and
$R_2$ is —H or a —$CH_3$ group
provided that $R_1$ is not t-butyl; and
x is not 3 when both $R_1$ and $R_3$ are methyl; and (b) isolating and drying the DMC catalyst.

30. The method of claim 29, wherein the aqueous solution of step (a) is subjected to a homogenization process.

31. The method of claim 29, wherein x is 3, $R_1$ is —$CH_3$ and each $R_2$ is hydrogen.

32. A DMC catalyst produced by the method of claim 29 and which exhibits the XRPDs of any of FIGS. 5–11.

33. The method of claim 26, further consisting of washing the precipitate with a mixture of water and organic complexing agent.

34. A double metal cyanide ("DMC") catalyst consisting of a double metal cyanide compound and a complexing agent of the formula:

$$R_1O(CH_2CHR_2O)_xH \qquad (I)$$

wherein:
x is 1, 2, or 3;
$R_1$ is a $C_1$–$C_4$ alkyl group; and
$R_2$ is —H or a —$CH_3$ group
provided that $R_1$ is not t-butyl; and
further wherein the double metal cyanide catalyst does not contain a secondary complexing agent.

35. The catalyst of claim 34, wherein $R_1$ and each are $R_2$ are —$CH_3$ and x is 3.

36. The catalyst of claim 34, which contains neither cubic, U1 nor U1A crystalline phases.

37. The catalyst of claim 34, which contains cubic, U1 or U1A crystalline phases.

38. A double metal cyanide ("DMC") catalyst consisting of a double metal cyanide compound and a complexing agent of the formula:

$$R_1O(CH_2CHR_2O)_xH \qquad (I)$$

wherein:
x is 1, 2, or 3;
$R_1$ is a $C_1$–$C_4$ alkyl group; and
$R_2$ is —H or a —$CH_3$ group
provided that $R_1$ is not t-butyl; and
x is not 3 when both $R_1$ and $R_2$ are methyl.

39. The catalyst of claim 38, which contains neither cubic, U1 nor U1A crystalline phases.

40. The catalyst of claim 38, which contains cubic, U1 or U1A crystalline phases.

41. The catalyst of claim 38, wherein to DMC compound is zinc hexacyanocobaltate and the metal salt is a zinc halide.

42. The catalyst of claim 38, wherein the double metal cyanide compound is the reaction product of a metal salt and a metal cyanide which contains greater than about 0.2 moles of the metal salt per mole of metal cyanide.

43. The catalyst of claim 38, wherein $R_1$ is -$CH_3$, each $R_2$ is -H, and x is 3.

44. The catalyst of claim 38, wherein $R_1$ is -$CH_3$, $R_2$ is -CH, and x is 1.

45. The catalyst of claim 38, wherein $R_1$ is -$CH_3$, $R_2$ is -CH, and x is 2.

46. The catalyst of claim 38, wherein $R_1$ is -$CH_3$, $R_2$ is -CH, and x is 2.

47. The catalyst of claim 38, wherein $R_2$ is -H and x is 1.

* * * * *

UNITED STATES PATENT AND TRADEMARK OFFICE
CERTIFICATE OF CORRECTION

PATENT NO.   : 6,642,171 B2
DATED        : November 4, 2003
INVENTOR(S)  : James M. O'Connor and Robin L. Grieve It is certified that error appears in the above-identified patent and that said Letters Patent is hereby corrected as shown below:

Column 34,
Line 26, insert -- 3 -- after "–CH"
Line 28, delete "-CH" and insert -- –H --
Line 30, insert -- 3 -- after "–CH"

Signed and Sealed this

Thirteenth Day of April, 2004

JON W. DUDAS
*Acting Director of the United States Patent and Trademark Office*